United States Patent
Ikemoto et al.

(10) Patent No.: US 10,246,567 B2
(45) Date of Patent: Apr. 2, 2019

(54) POLYOLEFIN MICROPOROUS FILM

(75) Inventors: Takashi Ikemoto, Tokyo (JP); Yoshihiro Imamura, Tokyo (JP)

(73) Assignee: ASAHI KASEI E-MATERIALS CORPORATION, Tokyo (JP)

( * ) Notice: Subject to any disclaimer, the term of this patent is extended or adjusted under 35 U.S.C. 154(b) by 1364 days.

(21) Appl. No.: 13/142,074

(22) PCT Filed: Dec. 25, 2009

(86) PCT No.: PCT/JP2009/007262
§ 371 (c)(1),
(2), (4) Date: Jan. 25, 2012

(87) PCT Pub. No.: WO2010/073707
PCT Pub. Date: Jul. 1, 2010

(65) Prior Publication Data
US 2011/0262814 A1    Oct. 27, 2011

(30) Foreign Application Priority Data

Dec. 26, 2008 (JP) .................................. 2008-334528
Sep. 14, 2009 (JP) .................................. 2009-212512

(51) Int. Cl.
| *H01M 2/16* | (2006.01) |
| *C08J 5/18* | (2006.01) |
| *H01M 2/14* | (2006.01) |
| *B29C 55/16* | (2006.01) |

(52) U.S. Cl.
CPC ............ *C08J 5/18* (2013.01); *H01M 2/145* (2013.01); *H01M 2/1653* (2013.01); *B29C 55/16* (2013.01); *C08J 2323/02* (2013.01)

(58) Field of Classification Search
None
See application file for complete search history.

(56) References Cited

U.S. PATENT DOCUMENTS

| 4,994,335 | A | * | 2/1991 | Kamaei ............ B01D 67/0027 |
| | | | | 264/159 |
| 6,048,607 | A | | 4/2000 | Hashimoto et al. |
| 6,245,272 | B1 | * | 6/2001 | Takita .................... B01D 69/02 |
| | | | | 210/500.42 |
| 2007/0148552 | A1 | | 6/2007 | Ikemoto et al. |
| 2010/0021822 | A1 | * | 1/2010 | Ikemoto .............. H01M 2/1653 |
| | | | | 429/247 |
| 2010/0203396 | A1 | | 8/2010 | Murata |

FOREIGN PATENT DOCUMENTS

| EP | 2 108 675 A1 | 10/2009 |
| JP | 9-12756 | 1/1997 |
| JP | 10-258462 | 9/1998 |
| JP | 2002-194132 | 7/2002 |
| JP | 2004-99799 | 4/2004 |
| WO | WO 2005/061599 A1 | 7/2005 |
| WO | WO 2008/013114 A1 | 1/2008 |
| WO | WO 2008/093572 A1 | 8/2008 |
| WO | WO 2008/149986 A1 | 12/2008 |

OTHER PUBLICATIONS

International Preliminary Report on Patentability dated Aug. 25, 2011 in International Application No. PCT/JP2009/007262.
International Search Report from the Japanese Patent Office in International Application No. PCT/JP2009/007262, dated Feb. 9, 2010.
International Preliminary Report on Patentability dated Aug. 16, 2011 in International Application No. PCT/JP2009/007262.

* cited by examiner

*Primary Examiner* — Ladan Mohaddes

(74) *Attorney, Agent, or Firm* — Finnegan, Henderson, Farabow, Garrett & Dunner, LLP

(57) ABSTRACT

There is provided a polyolefin microporous film which is excellent in taking-up stability in a production line and a processing line of the polyolefin microporous film, and further in a line for a battery taking-up step, and hardly generates step deviation when a roll thereof has received an impact.

The polyolefin microporous film has a compression elastic modulus of 0.1 to 1,000 kPa, and a ratio of a tensile elastic modulus in the longitudinal direction to a tensile elastic modulus in the transverse direction of 1.5 to 7.8.

11 Claims, 2 Drawing Sheets

POLYOLEFIN MICROPOROUS FILM

TECHNICAL FIELD

The present invention relates to a polyolefin microporous film.

BACKGROUND ART

Polyolefin microporous films are broadly used as separation and permselective separation films, separation materials and the like for various types of substances, and examples of applications thereof include microfiltration films, separators for fuel cells, separators for capacitors, base materials of functional films to develop new functions by filling pores with a functional material, and separators for batteries. Particularly, polyolefin microporous films are suitably used as separators for lithium ion batteries broadly used for mobile devices, such as laptop computers, cellular phones, digital cameras and the like. For the reason, it can be cited that the mechanical strength and insulative performance of the films are high.

For example, Patent Literatures 1 and 2 disclose polyethylene microporous films having both good permeation performance and high strength. Patent Literature 3 discloses a polyolefin microporous film whose thermal shrinkage is suppressed. Patent Literature 4 discloses a polyolefin microporous film having a narrow pore distribution and a high strength.

Patent Literature 5 further discloses a rolled microporous film excellent in workability in production of a battery.

CITATION LIST

Patent Literature

Patent Literature 1: Japanese Patent Laid-Open No. 2002-194132

Patent Literature 2: Japanese Patent Laid-Open No. 10-258462

Patent Literature 3: Japanese Patent Laid-Open No. 9-012756

Patent Literature 4: International Publication No. WO 2005/061599

Patent Literature 5: Japanese Patent Laid-Open No. 2004-99799

SUMMARY OF INVENTION

Technical Problem

In recent years, the length of electrodes and a separator to be rolled has tended to be long sized along with batteries having an elevated capacity; the rolling length of separator rolls (hereinafter, also referred to simply as "roll") has tended to be made long, that is, to be long sized. In this case, no generation of roll deviation and step deviation in a roll is demanded from the viewpoint of stable operation of a production line of batteries.

"Roll deviation" mentioned here refers to that edge faces of a roll formed by side edges of a filmy separator are not trued up and generate unevenness; and "step deviation" refers to that when impact is impressed on a roll, edge faces of a roll generate steps. Either thereof may cause faulty taking-up in a step of taking up a positive and negative electrodes and a separator (hereinafter, also referred to simply as "battery taking-up step) in production of a battery.

Any of the polyolefin microporous films described in Patent Literatures 1 to 4 cited above still has room for improvement from the viewpoint of enhancing both of the long sizing, and the rolling stability, that is, the property of suppressing the frequency of roll deviation generation in a rolling step in the production line of a polyolefin microporous film, in a rolling step in slitting the polyolefin microporous film, and in a step for taking-up a battery, and further from the viewpoint of hardly generating step deviation when impact is impressed on the roll in transportation or the like.

Although Patent Literature 5 discloses a roll, the literature is limited to the disclosure of studies on the size and shape of a roll itself, and there is made no study to focus on physical properties and materials of microporous films and simultaneously actualize both excellent long sizing and rolling stability.

The present invention has been achieved in consideration of the above-mentioned situations, and has an object to provide a polyolefin microporous film which is excellent in taking-up stability in a production line and a processing line of the polyolefin microporous film, and further in a line for taking up a battery, and hardly generates step deviation when the roll has received an impact.

Additionally, the present invention attaches much importance to the battery taking-up stability and has an object to provide a polyolefin microporous film hardly generating roll deviation and step deviation.

Solution to Problem

The present inventors have exhaustively studied in order to solve the above-mentioned problem. As a result, the present inventors have found that in order to make the rolling stability of a microporous film excellent, it is important that the microporous film itself is reasonably compressed in rolling to absorb minute thickness unevenness. The present inventors have further found that in order to suppress the step deviation of a roll due to impact even if the microporous film is long sized, it is particularly important that a reasonable stress is developed in the film thickness directions when the microporous film is compressed. These findings have led to the completion of the present invention.

The present inventors have further found that if the microporous film according to the present invention is further subjected to a hydrophilicizing treatment, the film resistance remarkably decreases, and this finding has led to the completion of the present invention.

That is, the present invention is as follows.

[1] A polyolefin microporous film having a compression elastic modulus of 0.1 to 1,000 kPa, and a ratio of a tensile elastic modulus in a longitudinal direction to a tensile elastic modulus in a transverse direction of 1.5 to 7.8.

[2] The polyolefin microporous film according to [1] described above, wherein the polyolefin microporous film has a friction coefficient in the transverse direction of 0.2 to 0.7.

[3] The polyolefin microporous film according to [1] or [2] described above, wherein the polyolefin microporous film has an average pore diameter of 0.05 to 0.10 μm.

[4] The polyolefin microporous film according to [1] or [2] described above, wherein the polyolefin microporous film has an average pore diameter of 0.06 to 0.09 μm.

[5] The polyolefin microporous film according to any one of [1] to [4] described above, wherein the polyolefin microporous film has a compression elastic modulus of 0.1 to 15 kPa.

[6] The polyolefin microporous film according to any one of [1] to [5] described above, wherein the polyolefin microporous film has been subjected to a hydrophilicizing treatment.
[7] A polyolefin microporous film roll, obtained by rolling the polyolefin microporous film according to any one of [1] to [6] described above.
[8] A separator for a nonaqueous electrolyte secondary battery, comprising the polyolefin microporous film according to any one of [1] to [6] described above.
[9] A nonaqueous electrolyte secondary battery, comprising the separator for the nonaqueous electrolyte secondary battery according to [8] described above, a positive electrode, a negative electrode, and the electrolyte.

Advantageous Effects of Invention

The present invention provides a polyolefin microporous film which is excellent in taking-up stability in a production line and a processing line of the polyolefin microporous film, and further in a line for a battery taking-up step, and hardly generates step deviation when the roll has received an impact.

DESCRIPTION OF EMBODIMENT

Figure 1:
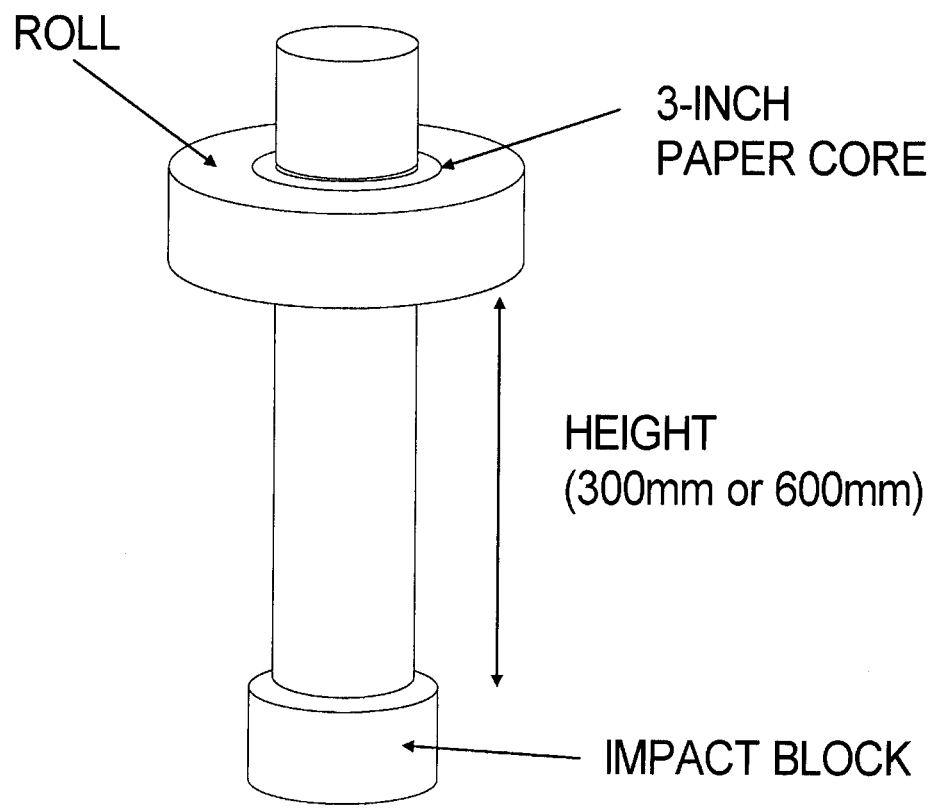
FIG. 1 is a schematic view illustrating a detection tool to evaluate step deviation, and a roll set thereon.

Hereinafter, an embodiment (hereinafter, abbreviated to "the present embodiment") of the present invention will be described in detail. The present invention is not limited to the present embodiment described below, and may be variously changed and modified within the gist.

The polyolefin microporous film in the present embodiment is adjusted to have a compression elastic modulus of 0.1 to 1,000 kPa, and a ratio of a tensile elastic modulus in the longitudinal direction to a tensile elastic modulus in the transverse direction of 1.5 to 7.8.

In the polyolefin microporous film of the present embodiment (hereinafter, abbreviated simply to "microporous film" in some cases), by setting the compression elastic modulus, and the ratio (hereinafter, referred to as "MD/TD elastic modulus ratio") of a tensile elastic modulus in the longitudinal direction (hereinafter, referred to as "MD elastic modulus") to a tensile elastic modulus in the transverse direction (hereinafter, referred to as "TD elastic modulus") in specific ranges, the synergistic action of both the properties can actualize a microporous film hardly generating roll deviation and hardly generating step deviation.

In the polyolefin microporous film of the present embodiment, by setting the compression elastic modulus, the ratio of a tensile elastic modulus in the longitudinal direction to a tensile elastic modulus in the transverse direction, and the average pore diameter in specific ranges, respectively, the synergistic action of the tripartite properties can actualize a microporous film which hardly generates roll deviation, hardly generates step deviation, and additionally, hardly causes a short-circuit in taking up a battery, is good in pin extractability, is low in air permeability after pressing, and is small in air permeability change ratio before and after pressing.

The compression elastic modulus of the microporous film of the present embodiment is 0.1 kPa or more from the viewpoint of developing a stress in the thickness direction when the microporous film is long sized to suppress the generation of step deviation. The compression elastic modulus is preferably 0.2 kPa or more, more preferably 0.3 kPa or more, still more preferably 0.5 kPa or more, and especially preferably 1 kPa or more. Additionally, from the viewpoint that the microporous film itself absorbs minute thickness unevenness in rolling and raises rolling stability, the compression elastic modulus of a microporous film is 1,000 kPa or less. The compression elastic modulus is preferably 500 kPa or less, more preferably 200 kPa or less, still more preferably 100 kPa or less, further still more preferably 50 kPa or less, especially preferably 20 kPa or less, especially preferably 15 kPa or less, especially preferably 10 kPa, and extremely preferably 5 kPa or less. The compression elastic modulus of a microporous film is preferably 0.1 to 15 kPa from the viewpoint of satisfying all of the properties of having an excellent rolling stability, hardly generating step deviation, hardly causing a short-circuit in taking up a battery, and having a good pin extractability, a low air permeability after pressing, and a low air permeability change ratio before and after pressing.

The compression elastic modulus of a microporous film is measured according to a method described in Examples described below.

Examples of a method of adjusting the compression elastic modulus of a microporous film in the above-mentioned range include a method of controlling the concentration of a polymer constituting the microporous film, and the limiting viscosity [η] of a polyolefin, and adjusting the cast temperature and the cast compression ratio.

In the microporous film of the present embodiment, the MD/TD elastic modulus ratio is 1.5 or more from the viewpoint of suppressing the deformation due to the tensile force in rolling, preventing the generation of roll deviation, and enhancing the rolling stability. The MD/TD elastic modulus ratio is preferably 1.6 or more, more preferably 1.7 or more, and still more preferably 1.8 or more. Additionally, the MD/TD elastic modulus ratio is 7.8 or less from the viewpoint of suppressing step deviation when a microporous film is long sized. The MD/TD elastic modulus ratio is preferably 6.0 or less, more preferably 5.0 or less, still more preferably 4.5 or less, and especially preferably 4.0 or less. Further, the MD/TD elastic modulus ratio of a microporous film is preferably 1.5 to 7.8 from the viewpoint of satisfying all of the properties of having an excellent rolling stability, hardly generating step deviation, hardly causing a short-circuit in taking up a battery, and having a good pin extractability, a low air permeability after pressing, and a low air permeability change ratio before and after pressing.

The MD/TD elastic modulus ratio of a microporous film is derived according to a method described in Examples described below.

Examples of a method of adjusting the MD/TD elastic modulus ratio of a microporous film in the above-mentioned range include a method of adjusting the cast temperature, the cast stretch ratio, and the stretch ratio after casting.

Although various types of microporous films are conventionally developed, with respect to properties of the conventional microporous films, if the compression elastic modulus is about 0.1 to 1,000 kPa, the MD/TD elastic modulus ratio is supposedly less than 1.5, or more than 7.8. This is supposedly because the MD/TD elastic modulus ratio is adjusted without rationalizing the cast temperature, the cast stretch ratio and the cast compression ratio. That is, there has conventionally been no technical idea of setting the compression elastic modulus in the above-mentioned range and simultaneously setting the MD/TD elastic modulus ratio in the above-mentioned range.

In order to adjust the compression elastic modulus to be 0.1 kPa or more, although a microporous film needs to be reasonably compressed in the film thickness direction, conventionally, the compression elastic modulus has been adjusted in the above-mentioned range not by compression in a cast process but only by stretching after casting. However, in order to raise the compression elastic modulus of a microporous film by a stretching process after casting, the areal stretch ratio needs to be set high. In order to suppress film break when the areal stretch ratio for a microporous film is set high, subjecting the microporous film to a stretching process in an isotropic ratio is efficient. Thereby, the MD/TD elastic modulus ratio must inevitably be less than 1.5.

By contrast, in order to adjust the compression elastic modulus to be 1,000 kPa or less, the areal stretch ratio for a microporous film in stretching after casting needs to be set low. In this case, in order to suppress film break even when a microporous film is produced at a high speed, since raising the MD tensile strength is more effective, the MD/TD elastic modulus ratio must inevitably be more than 7.8.

From the viewpoint of suppressing the generation of step deviation due to impact when the microporous film of the present embodiment is long sized, the dynamic friction coefficient (hereinafter, abbreviated simply to "friction coefficient" in some cases) of the microporous film is preferably 0.2 or more, more preferably 0.25 or more, and still more preferably 0.3 or more. Additionally, from the viewpoint of improving pin extraction in taking up a battery, the friction coefficient is preferably 0.7 or less, more preferably 0.65 or less, and still more preferably 0.6 or less. The friction coefficient of a microporous film is measured according to a method described in Examples described below. Examples of a method of adjusting the friction coefficient of a microporous film in the above-mentioned range include a method of controlling the concentration of a polymer constituting a microporous film, and adjusting the temperature in heat set treatment.

From the viewpoint of imparting a high transparency to the microporous film of the present embodiment, and enhancing battery properties when the microporous film is used as a separator for a battery, the average pore diameter of the microporous film is preferably 0.04 μm or more, more preferably 0.05 μm or more, and still more preferably 0.06 μm or more. Additionally, from the viewpoint of lessening the change of the permeability when a microporous film is compressed in the film thickness direction when the microporous film is slit and a battery is taken up, the average pore diameter is preferably 0.10 μm or less, more preferably 0.09 μm or less, and still more preferably 0.08 μm or less. Further, the average pore diameter of a microporous film is preferably 0.06 to 0.09 μm from the viewpoint of satisfying all of the properties of having an excellent rolling stability, hardly generating step deviation, hardly causing a short-circuit in taking up a battery, and having a good pin extractability, a low air permeability after pressing, and a low air permeability change ratio before and after pressing.

The average pore diameter of a microporous film is derived according to a method described in Examples described below. Examples of a method of adjusting the average pore diameter of a microporous film in the above-mentioned range include a method of controlling the concentration of a polymer constituting a microporous film, and adjusting the stretch or relaxation ratio in heat set treatment.

From the viewpoint of enhancing the insulation when the microporous film of the present embodiment is used as a separator for a battery, the film thickness of the microporous film is preferably 3 μm or more, more preferably 5 μm or more, still more preferably 10 μm or more, and especially preferably 15 μm or more. Additionally, from the viewpoint of enhancing battery properties when the microporous film is used as a separator for a battery, the film thickness of the microporous film is preferably 80 μm or less, more preferably 40 μm or less, still more preferably 35 μm or less, and especially preferably 30 μm or less. Confirmation of the film thickness of a separator taken out from a battery may be made by measuring a thickness of a portion of the separator having been in no contact with an electrode. The film thickness of a microporous film is measured according to a method described in Examples described below. Examples of a method of adjusting the film thickness of a microporous film in the above-mentioned range include a method of adjusting the thickness of a film after casting and the stretch ratio.

From the viewpoint of absorbing minute film thickness unevenness of the microporous film of the present embodiment, and enhancing the rolling stability, the porosity of the microporous film is preferably 30% or more, more preferably 35% or more, still more preferably 40% or more, and especially preferably 45% or more. Additionally, from the viewpoint of enhancing the insulation when the microporous film is used as a separator for a battery, the porosity is preferably 80% or less, more preferably 70% or less, still more preferably 65% or less, and especially preferably 60% or less. The porosity of a microporous film is derived according to a method described in Examples described below. Examples of a method of adjusting the porosity of a microporous film in the above-mentioned range include a method of adjusting the concentration of a polymer constituting a microporous film.

From the viewpoint of enhancing the insulative performance of the microporous film of the present embodiment, the air permeability of the microporous film is preferably 10 sec/100 cc or more, more preferably 30 sec/100 cc or more, still more preferably 50 sec/100 cc or more, especially preferably 80 sec/100 cc or more, and extremely preferably 100 sec/100 cc or more. Additionally, from the viewpoint of imparting high battery properties to a battery having the microporous film, the air permeability is preferably 500 sec/100 cc or less, more preferably 400 sec/100 cc or less, still more preferably 300 sec/100 cc or less, especially preferably 250 sec/100 cc or less, and extremely preferably 200 sec/100 cc or less. The air permeability of a microporous film is measured according to a method described in Examples described below. Examples of a method of adjusting the air permeability of a microporous film in the above-mentioned range include a method of controlling the concentration of a polymer constituting a microporous film, and adjusting the stretch ratio and the temperature in heat set treatment.

From the viewpoint of enhancing the mechanical strength of the microporous film of the present embodiment, the puncture strength of the microporous film is preferably 0.07 N/μm or more, more preferably 0.08 N/μm or more, still more preferably 0.09 N/μm or more, and especially preferably 0.1 N/μm or more. Additionally, from the viewpoint of acquiring a high flexibility and rolling stability, the puncture strength is preferably 0.8 N/μm or less, more preferably 0.6 N/μm or less, and still more preferably 0.4 N/μm or less. The puncture strength of a microporous film is derived according to a method described in Examples described below.

Examples of a method of adjusting the puncture strength of a microporous film in the above-mentioned range include a method of adjusting the limiting viscosity [η] of a polymer such as a polyolefin constituting the microporous film, and adjusting the stretch ratio.

From the viewpoint of suppressing the deformation due to a tensile force and preventing the generation of roll deviation and wrinkles to enhance the rolling stability in rolling the microporous film of the present embodiment, the MD elastic modulus of the microporous film is preferably 100 MPa or more, more preferably 200 MPa or more, still more preferably 300 MPa or more, and especially preferably 500 MPa or more. Additionally, in order to suppress the generation of wrinkles in rolling, the MD elastic modulus is preferably 3,000 MPa or less, more preferably 2,000 MPa or less, still more preferably 1,500 MPa or less, and especially preferably 1,000 MPa or less. The MD elastic modulus of a microporous film is measured according to a method described in Examples described below. Examples of a method of adjusting the MD elastic modulus of a microporous film in the above-mentioned range include a method of adjusting the cast temperature, the cast stretch ratio, the stretch ratio, and the stretching temperature.

From the viewpoint of suppressing roll deviation when the microporous film of the present embodiment is rolled, the TD elastic modulus of the microporous film is preferably 60 MPa or more, more preferably 70 MPa or more, and still more preferably 80 MPa or more. Additionally, from the viewpoint of absorbing the minute film thickness unevenness of the microporous film and enhancing the rolling stability, the TD elastic modulus is preferably 3,000 MPa or less, more preferably 2,000 MPa or less, and still more preferably 1,000 MPa or less. The TD elastic modulus of a microporous film is measured according to a method described in Examples described below. Examples of a method of adjusting the TD elastic modulus of a microporous film in the above-mentioned range include a method of adjusting the cast temperature, the cast stretch ratio, the stretch ratio, and the stretching temperature.

From the viewpoint of suppressing the deformation due to a tensile force, and preventing the generation of roll deviation and wrinkles to enhance the rolling stability in rolling the microporous film of the present embodiment, the tensile strength at break in the longitudinal direction (hereinafter, referred to as "MD tensile strength at break") of the microporous film is preferably 10 MPa or more, more preferably 30 MPa or more, and especially preferably 50 MPa or more. Additionally, from the viewpoint of suppressing the generation of wrinkles in rolling, the MD tensile strength at break is preferably 500 MPa or less, more preferably 400 MPa or less, and especially preferably 300 MPa or less. The MD tensile strength at break of a microporous film is measured according to a method described in Examples described below. Examples of a method of adjusting the MD tensile strength at break of a microporous film in the above-mentioned range include a method of adjusting the cast temperature, the cast stretch ratio, the stretch ratio, and the stretching temperature.

From the viewpoint of suppressing roll deviation when the microporous film of the present embodiment is rolled, the tensile strength at break in the transverse direction (hereinafter, referred to as "TD tensile strength at break") of the microporous film is preferably 10 MPa or more, more preferably 20 MPa or more, still more preferably 30 MPa or more, and especially preferably 50 MPa or more. Additionally, from the viewpoint of absorbing the minute film thickness unevenness of the microporous film and enhancing the rolling stability, the TD tensile strength at break is preferably 500 MPa or less, more preferably 400 MPa or less, still more preferably 300 MPa or less, and especially preferably 200 MPa or less. The TD tensile strength at break of a microporous film is measured according to a method described in Examples described below. Examples of a method of adjusting the TD tensile strength at break of a microporous film in the above-mentioned range include a method of adjusting the cast temperature, the cast stretch ratio, the stretch ratio, and the stretching temperature.

From the viewpoint of imparting high battery properties to a battery having the microporous film of the present embodiment, the air permeability change ratio before and after pressing when the microporous film is pressed at a temperature of 40° C. and a pressure of 5 MPa for 30 sec is preferably 150% or less, more preferably 50% or less, and still more preferably 30% or less. Here, the air permeability change ratio before and after pressing is indicated by the following expression:

(Air permeability change ratio before and after pressing)=((air permeability after pressing)−(air permeability before pressing))×100/(air permeability before pressing)

By adjusting the compression elastic modulus, the ratio of the tensile elastic modulus in the longitudinal direction to the tensile elastic modulus in the transverse direction, and the average pore diameter in respective specific ranges, a microporous film having a low air permeability change ratio before and after pressing can be obtained.

From the viewpoint of enhancing the insulative performance, the air permeability after pressing of the microporous film of the present embodiment is preferably 10 sec/100 cc or more, more preferably 30 sec/100 cc or more, still more preferably 50 sec/100 cc or more, especially preferably 80 sec/100 cc or more, and extremely preferably 100 sec/100 cc or more. Additionally, from the viewpoint of imparting high battery properties to a battery having the microporous film, the air permeability after pressing is preferably 800 sec/100 cc or less, more preferably 600 sec/100 cc or less, still more preferably 500 sec/100 cc or less, especially preferably 400 sec/100 cc or less, and extremely preferably 300 sec/100 cc or less. The air permeability after pressing of a microporous film is measured according to a method described in Examples described below. Examples of a method of adjusting the air permeability after pressing of a microporous film in the above-mentioned range include a method of controlling the concentration of a polymer constituting the microporous film, and adjusting the cast compression ratio and the stretch ratio as described later.

By adjusting the compression elastic modulus, the ratio of the tensile elastic modulus in the longitudinal direction to the tensile elastic modulus in the transverse direction, and the average pore diameter in respective specific ranges, a microporous film having a low air permeability after pressing can be obtained.

Even in the case where the microporous film of the present embodiment is long sized, from the viewpoint of suppressing the changes of the permeability and the film thickness, and enhancing battery properties and the insulation when the microporous film is used as a separator for a battery, the limiting viscosity [η] of the microporous film is preferably 2.5 dL/g or more, more preferably 3.0 dL/g or more, and still more preferably 3.5 dL/g or more. Additionally, from the viewpoint of obtaining a microporous film having a high formability, the limiting viscosity [η] is preferably 9.0 dL/g or less, more preferably 8.5 dL/g or less, and still more preferably 8.0 dL/g or less. The limiting viscosity of a microporous film is measured according to a method described in Examples described below. Examples of a method of adjusting the limiting viscosity [η] of a microporous film in the above-mentioned range include a method of controlling the limiting viscosity [η] of a polymer constituting the microporous film.

The microporous film of the present embodiment is formed of a polyolefin composition containing a polyolefin. The content of the polyolefin as a main component in the polyolefin composition is preferably 50 to 100% by mass, more preferably 60 to 100% by mass, still more preferably 70 to 100% by mass, further still more preferably 80 to 100% by mass, especially preferably 90 to 100% by mass, and extremely preferably 95 to 100% by mass.

The polyolefin constituting the polyolefin composition in the present embodiment is not especially limited, and includes polyethylene, polypropylene and poly-4-methyl-1-pentene. These polyolefins are used singly or in combination of two or more. However, one or more polyethylenes are preferably used from the viewpoint of excellent stretchability when formed into a polyolefin microporous film.

In the case of using a polyethylene as a polyolefin, from the viewpoint of obtaining a microporous film having a high mechanical strength, the polyolefin preferably contains a polyethylene homopolymer having a density of 0.940 g/cm$^3$ or more.

From the viewpoint of improving the mechanical strength of a microporous film, the polyolefin composition in the present embodiment preferably contains 5 to 90% by mass of an ultrahigh molecular weight polyethylene having a limiting viscosity [n] of 5.5 to 33 dL/g based on the total amount of the polyolefin composition. From the viewpoint of improving also the formability into a microporous film, the polyolefin composition more preferably contains 5 to 80% by mass of the ultrahigh molecular weight polyethylene. Further from the viewpoint of improving the permeability of a microporous film, the polyolefin composition in the present embodiment preferably contains 10 to 95% by mass of a high-density polyethylene based on the total amount of the polyolefin composition.

In the case of using a polypropylene as a polyolefin, specific examples thereof include a propylene homopolymer, an ethylene-propylene random copolymer and an ethylene-propylene block copolymer. Above all, the polypropylene is preferably a polypropylene homopolymer. In the case where a polypropylene is a copolymer, from the viewpoint of not decreasing the degree of crystallinity of the polypropylene, and not decreasing the permeability of a microporous film, the content of ethylene as a comonomer is preferably 1.0% by mass or less. From the viewpoint of improving the formability into a microporous film, the polypropylene preferably has a limiting viscosity [η] of 1 to 25 dL/g, and more preferably 2 to 7 dL/g. The polyolefin composition in the present embodiment contains preferably an amount exceeding 0% by mass and 10% by mass or less of a polypropylene, and more preferably 1 to 9% by mass thereof, based on the total amount of the polyolefin composition.

The polyolefin composition in the present embodiment may contain well-known additives including: inorganic materials; antioxidants such as phenolic, phosphorus-based and sulfur-based ones; metal soaps such as calcium stearate and zinc stearate; ultraviolet absorbents; light stabilizers; antistatic agents; antifogging agents; and coloring pigments; and lubricants and other improving agents. The addition amount thereof is preferably 50 parts by mass or less, and more preferably 40 parts by mass or less, based on 100 parts by mass of resin components in the polyolefin composition.

Preferable inorganic materials are inorganic powders, and examples thereof include silica, calcium silicate, aluminum silicate, alumina, calcium carbonate, magnesium carbonate, kaolin clay, talc, titanium oxide, carbon black and diatomaceous earth. Above all, silica is preferable from the viewpoint of the dispersibility and the easiness of extraction.

The polyolefin microporous film roll of the present embodiment is a roll obtained by rolling a polyolefin microporous film on a core. Here, a "roll" refers to a body obtained by rolling a predetermined length of a microporous film having a uniform width. The width is not especially limited, but is usually about 10 mm to 1,000 mm, and in the case of using the microporous film as a separator for a lithium ion secondary battery, is usually about 20 mm to 500 mm.

On the other hand, the rolling length of the polyolefin microporous film roll is generally about 50 to 1,0000 m. In the case of using the microporous film as a separator for a lithium ion battery, the length is usually about 500 to 1,000 m. A long roll mentioned in the present embodiment is a roll of preferably 1,200 m or longer, more preferably 1,500 m or longer, still more preferably 1,700 m or longer, further still more preferably 2,000 m or longer, and most preferably 2,200 m or longer. If the rolling length is long, the replacement of separators in taking up batteries can be in a low frequency, thereby allowing to improve battery productivity.

The length of a long roll does not have especially an upper limit, but the length is preferably 5,000 m or less in consideration of handling of the roll.

In the polyolefin microporous film roll of the present embodiment, from the viewpoint of suppressing roll deviation generated during transportation, the deviation width after a step deviation test for a 1,000-m roll using a 3-inch core is preferably 5 mm or less, and more preferably 3 mm or less. Also in a step deviation test for a 2,000-m roll, and a step deviation test for a 5,000-m roll, the deviation width is more preferably 5 mm or less.

Here, the above-mentioned "core" refers to a paper core, or a polyolefin resin-, an ABS resin- or a phenol resin-made cylindrical roll core used for taking up a microporous film. In such a core, from the viewpoint of relaxing rolling compactation after rolling of the microporous film, the outer diameter is preferably 3 inches or more, more preferably 6 inches or more, still more preferably 8 inches or more, and further still more preferably 9 inches or more. From the viewpoint of the handling, the outer diameter of the core is preferably 20 inches or less, and more preferably 15 inches or less.

The method for producing the microporous film of the present embodiment is not especially limited, and examples thereof include production methods comprising the following steps of (a), (b), (c), (d) and (e).

The (a) step is a melting and kneading step of melting and kneading a polyolefin composition and a plasticizer.

The (b) step is a cast step of extruding the kneaded material obtained through the (a) step into a sheet-form, and cooling and solidifying the sheet form.

The (c) step is a stretching step of stretching the sheet-form material obtained from the polyolefin composition at least in the uniaxial direction.

The (d) step is an extraction step of extracting the plasticizer from the formed material obtained from the polyolefin composition.

The (e) step is a heat set step of heat setting the stretched film obtained through the (c) step.

Hereinafter, the production method of the microporous film of the present embodiment will be described more specifically, but the kind of a polymer, the kind of a solvent, the extrusion method, the stretching method, the extraction method, the pore-making method, the heat set and heat treatment method and the like are not any more limited as long as an obtained microporous film satisfies the above-mentioned properties.

In the production method of the microporous film of the present embodiment, the order and the number of repeating times of the above-mentioned steps are not especially limited, but preferably include the following three types.

A first preferable order of the steps is an order of the (a) step, the (b) step, the (c) step, the (d) step and the (e) step.

A second preferable order of the steps is an order of the (a) step, the (b) step, the (c) step, the (d) step, the (c) step and the (e) step.

A third preferable order of the steps is an order of the (a) step, the (b) step, the (d) step, the (c) step and the (e) step.

Among these, the first or the second order of the steps is more preferable. Hereinafter, each step will be described in detail.

(a) A Melting and Kneading Step

In (a) a melting and kneading step, a polyolefin composition and a plasticizer in the present embodiment are blended, then melted and kneaded. In the case where the polyolefin composition contains an antioxidant, the concentration thereof is preferably 0.2% by mass or more from the viewpoint of preventing the molecular deterioration, and preferably 3% by mass or less from the viewpoint of economical efficiency, based on the total amount of the polyolefin composition. The concentration is more preferably 0.4 to 3% by mass, and still more preferably 0.5 to 2% by mass.

The "plasticizer" described above refers to a nonvolatile solvent capable of forming a homogeneous solution at the melting point or a higher temperature when the plasticizer is blended with the polyolefin composition. Examples of the plasticizer include hydrocarbons such as fluid paraffin and paraffin wax; di-2-ethylhexyl phthalate (DOP); diisodecyl phthalate; and diheptyl phthalate. Above all, fluid paraffin is preferable.

The concentration of resin components based on the total amount of a polyolefin composition and a plasticizer to be melted and kneaded (hereinafter, abbreviated to "PC" in some cases) is preferably 20 to 95% by mass, and more preferably 30 to 80% by mass, from the viewpoint of improving the permeability of a film and the film formability.

In the melting and kneading step, after blending is carried out by, for example, a Henschel mixer, a ribbon blender or a tumbler blender, melting and kneading is carried out by, for example, a screw extruder such as a single-screw extruder or a twin-screw extruder, a kneader or a Banbury mixer. The method of melting and kneading is preferably a method of melting and kneading by a continuously operable extruder. The extruder is preferably a continuously operable twin-screw extruder from the viewpoint of good kneadability.

A plasticizer may be blended with a polyolefin composition in advance by a Henschel mixer or the like as described above, and then melted and kneaded. In addition to, or in place of the method, the plasticizer may be fed directly to an extruder when melting and kneading is carried out.

Further from the viewpoint of preventing the deterioration of resins by heating in melting and kneading, melting and kneading is carried out preferably in an inert gas atmosphere such as nitrogen.

The temperature in melting and kneading is, from the viewpoint of improving the dispersibility of each component in a blend, preferably 140° C. or more, more preferably 160° C. or more, and still more preferably 180° C. or more. From the viewpoint of preventing the molecular deterioration, the temperature is preferably 300° C. or less, more preferably 280° C. or less, and still more preferably 260° C. or less.

(b) A Cast Step

In (b) a cast step, the kneaded material obtained through the melting and kneading step is extruded into a sheet, which is then cooled and solidified. The cooling method includes a method in which a kneaded material is brought into direct contact with a coolant such as cool air or cool water, and a method in which a kneaded material is brought into contact with a roll or a press machine cooled by a coolant. Above all, the method in which a kneaded material is brought into contact with a roll or a press machine cooled by a coolant is preferable in the point of being excellent in the thickness controllability of a microporous film.

With respect to the cast temperature in cooling, from the viewpoint of raising the compression elastic modulus of a microporous film, the cooling temperature of a roll or a press machine is preferably 100° C. or less, more preferably 90° C. or less, still more preferably 80° C. or less, and especially preferably 70° C. or less. From the viewpoint of raising the permeability of a microporous film, the cooling temperature is preferably 5° C. or more, and more preferably 10° C. or more.

By cooling the kneaded material while stretching it in the mechanical direction when it is cast, the MD/TD elastic modulus ratio can be controlled in a favorable range. In this case, from the viewpoint of raising the MD/TD elastic modulus ratio, the stretch ratio in cast, that is, the cast stretch ratio is preferably 1.01 or more, more preferably 1.03 or more, and still more preferably 1.05 or more. From the viewpoint of raising the compression elastic modulus, the cast stretch ratio is preferably 1.50 or less, more preferably 1.40 or less, still more preferably 1.30 or less, and especially preferably 1.20 or less. In the case of using a roll when stretching is carried out in cast in such a way, a kneaded material may be stretched by one roll, or may be stretched between a plurality of rolls.

By controlling the compression ratio, which is a ratio of the thickness of a sheet-form material obtained in the cast step and the thickness of a kneaded material before the cast step, the compression elastic modulus of a microporous film can be adjusted. From the viewpoint of raising the compression elastic modulus to 0.1 kPa or more, the compression ratio is preferably 1.1 or more, more preferably 1.2 or more, and still more preferably 1.5 or more. Additionally, from the viewpoint of lessening the compression elastic modulus of a microporous film to 1,000 kPa or less, the compression ratio is preferably 3.0 or less, more preferably 2.8 or less, and still more preferably 2.5 or less. Further from the viewpoint of lessening the compression elastic modulus of a microporous film to 15 kPa or less, the compression ratio is preferably 2.0 or less.

Here, "thickness of a kneaded material before the cast step" refers to the thickness in the direction compressed in the cast step, that is, in the same direction as the thickness direction of an obtained sheet-form material. In the case of passing a kneaded material through a die and subjecting the kneaded material to a cast treatment by a cool roll, the thickness of the kneaded material before the cast step can be determined by the measurement of a lip clearance of the die.

(c) A Stretching Step

In (c) a stretching step, a sheet-form material obtained from the polyolefin composition is stretched at least in the uniaxial direction. The stretching method includes serial biaxial stretching using a combination of a roll stretching machine and a tenter, and simultaneous biaxial stretching using a simultaneous biaxial tenter or inflation molding. Above all, from the viewpoint of obtaining a high-strength microporous film, the simultaneous biaxial stretching is preferable, and the simultaneous biaxial stretching using a simultaneous biaxial tenter is more preferable.

The areal stretch ratio is, from the viewpoint of improving the mechanical strength and improving the compression elastic modulus, preferably 6 times or more, more preferably 10 times or more, still more preferably 15 times or more, and especially preferably 20 times or more. Additionally, from the viewpoint of reducing the heat shrinkage stress due to excessive stretching, the areal stretch ratio is preferably 100 times or less, more preferably 60 times or less, and still more preferably 50 times or less.

The ratio of stretch ratios of MD to TD in the (c) step is, from the viewpoint of rationalizing the MD/TD elastic modulus ratio, preferably 1.0 to 2.5 times, more preferably 1.1 to 2.0 times, and still more preferably 1.4 to 2.0 times.

The stretching temperature can be selected in consideration of a raw material resin composition contained in a polyolefin composition, and the concentration thereof. The stretching temperature is preferably in the range of (the melting point of a major compositional resin−30° C.) to the melting point of the major compositional resin, from the viewpoint of preventing breakage due to an excessive stretch stress. For example, in the case where the major compositional resin is a polyethylene, the stretching temperature is preferably 110° C. or more, and from the viewpoint of enhancing the strength of a microporous film, is preferably 130° C. or less. The stretching temperature is more preferably 115 to 128° C., and still more preferably 118 to 125° C. Here, "major compositional resin" refers to a resin contained in the most amount among resins contained in a polyolefin composition.

In order to raise the compression elastic modulus, in the production method of the microporous film of the present embodiment, the stretching step is carried out preferably before an extraction step described below.

(d) An Extraction Step

In an (d) extraction step, the plasticizer is extracted from the formed material obtained from the polyolefin composition. An extraction solvent is preferably used when the plasticizer is extracted. An extraction solvent is preferably one which is a poor solvent to a polyolefin constituting a microporous film and a good solvent to the plasticizer, and has a boiling point less than the melting point of the polyolefin constituting the microporous film. Examples of such an extraction solvent include hydrocarbons such as n-hexane and cyclohexane; halogenated hydrocarbons such as methylene chloride and 1,1,1-trichloroethane; non-chlorine-type halogenated solvents such as hydrofluoro ethers and hydrofluorocarbons; alcohols such as ethanol and isopropanol; ethers such as diethyl ether and tetrahydrofuran; and ketones such as acetone and methyl ethyl ketone. An extraction solvent is suitably selected from these solvents, and is used singly or as a mixture of two or more. Above all, methylene chloride and methyl ethyl ketone are preferable as the extraction solvent.

In order to extract a plasticizer, a sheet-form material obtained through the cast step or the stretching step may be immersed in or showered with the extraction solvent to extract the plasticizer, and thereafter, the sheet-form material may be fully dried to remove the extraction solvent.

In the case where the polyolefin composition contains an inorganic powder, a part of or the whole of the inorganic powder may be extracted with a solvent capable of dissolving the inorganic powder.

(e) A Heat Set Step

In a (e) heat set step, the stretched film obtained through the (c) stretching step is thermally set. The heat set (hereinafter, abbreviated to "HS" in some cases) can be carried out in a predetermined temperature atmosphere in combination of a low-stretch ratio stretching and a relaxation operation by a tenter, a roll stretching machine or the like.

The treatment temperature of the heat set step in the present embodiment is preferably a temperature of (the melting point of a major compositional resin−10° C.) or more and less than the melting point of the major compositional resin, and more preferably a temperature of (the melting point of a major compositional resin−4° C.) or more and less than the melting point of the major compositional resin. In the case where a stretched film is thermally set at a temperature of (the melting point of a major compositional resin−10° C.) or more, the dynamic friction coefficient of a microporous film can be adjusted in a predetermined range, for example, to 0.7 or less. In the case where a microporous film is thermally set at a temperature of less than the melting point of a major compositional resin, clogging of micropores formed before presteps of the heat set step can be prevented, and the permeability of a microporous film can be maintained high. For example, in the case where a polyethylene homopolymer is the major compositional resin, and has a melting point of 134° C., the treatment temperature in the heat set step is preferably 124° C. or more and less than 134° C., and more preferably 130° C. or more and less than 134° C.

The stretch ratio in a low-stretch ratio stretching is, from the viewpoint of rationalizing the elastic modulus ratio for MD and/or TD of a stretching film, preferably 1.05 to 1.7 times, more preferably 1.1 to 1.6 times, and still more preferably 1.2 to 1.5 times.

The relaxation operation refers to an operation to approach the size of MD and/or TD of a stretched film slightly to the size thereof before the stretching step. The relaxation ratio to the film size of a stretched film is, from the viewpoint of reducing the heat shrinkage, preferably 0.9 time or less, more preferably 0.85 time or less, and still more preferably 0.8 time or less.

In the production method of the microporous film of the present embodiment, as required, surface treatments such as electron beam irradiation, plasma irradiation, ion beam irradiation, surfactant application and chemical modification can be carried out on a microporous film obtained through the heat set step in the range of not damaging the advantages of the present invention.

If a hydrophilicizing treatment is carried out on the microporous film of the present embodiment, wettability of the film to an electrolyte is likely to be improved, and the film resistance is likely to be remarkably reduced, which are preferable.

Examples of the hydrophilicizing treatment method include a corona discharge method, an ultraviolet irradiation method, a hot air treatment method, a chromic acid treatment method and a method of applying a hydrophilic resin solution on a surface. The degree of the hydrophilicizing treatment is preferably adjusted so that the wetting index of a film surface becomes 40 mN/m or more and 476 mN/m or less. In the case of a weak hydrophilicizing treatment, the decreasing effect of the film resistance is hardly developed; and in the case of an excessively strong hydrophilicizing treatment, the microporous film has a risk of being deteriorated. The wetting index is adjusted so as to be more preferably 45 mN/m or more and 476 mN/m or less, and still more preferably 50 mN/m or more and 476 mN/m or less.

Since the decreasing effect of the film resistance by the hydrophilicizing treatment is more easily developed with a higher porosity of a microporous film, the porosity of a microporous film is preferably 40% or more, more preferably 45% or more, and still more preferably 48% or more.

A chemical crosslinking agent such as a norbornene resin may be added to a polyolefin composition and/or a blend thereof in advance.

A polyolefin microporous film roll can be obtained by further carrying out a step of, as required, slitting and taking up an obtained polyolefin microporous film on a predetermined core.

The microporous film of the present embodiment can be used preferably as separation films such as for separation and permselection of substances, and separators of electrochemical devices such as nonaqueous electrolyte secondary battery, fuel cells and capacitors. More preferably, the microporous film of the present embodiment is used as separators for nonaqueous electrolyte secondary batteries; and still more preferably, that is used as separators for nonaqueous electrolyte square secondary batteries from the viewpoint of the adhesivity with a separator and electrodes.

The separator for a nonaqueous electrolyte secondary battery of the present embodiment may have the similar structure as conventional separators for nonaqueous electrolyte secondary batteries, except for containing the microporous film of the present embodiment.

The nonaqueous electrolyte secondary battery of the present embodiment comprises the separator for a nonaqueous electrolyte secondary battery of the present embodiment described above, a positive electrode, a negative electrode, and an electrolyte. The nonaqueous electrolyte secondary battery suffices if comprising the similar components and materials as those of well-known nonaqueous electrolyte secondary batteries, in addition to the separator for a nonaqueous electrolyte secondary battery of the present embodiment described above as a separator; it suffices if having the similar structure; and it can be produced by the similar method.

The above-mentioned various parameters are measured according to measurement methods in Examples described below unless otherwise specified.

EXAMPLES

Then, the present embodiment will be described more specifically by way of Examples and Comparative Examples, but the present embodiment is not limited to the following Examples without departing from the gist. Each physical property in Examples was measured by the following method.

(1) Film Thickness (μm)

The film thickness of a microporous film was measured using a film thickness meter (a thickness micrometer made by Toyo Seiki Seisaku-sho Ltd., type: KBN, terminal diameter: φ5 mm, measurement pressure: 62.47 kPa) at an atmosphere temperature of 23±2° C.

(2) Porosity (%)

A sample of 100 mm×100 mm square was cut out from a microporous film; the volume (mm$^3$) and the mass (mg) were determined, and from these and the film density (g/cm$^3$), the porosity was calculated using the following expression:

$$\text{Porosity}=(\text{volume}-\text{mass/film density})/\text{volume}\times 100$$

The volume was calculated from the size (100 mm×100 mm) and the film thickness; and the film density was calculated from the material density.

(3) Air Permeability (sec/100 cc)

The air permeability was measured according to JIS P-8117 using a Gurley air permeability tester (made by Toyo Seiki Seisaku-sho Ltd., trade name: "G-B2"). The weight of an inner cylinder was 567 g; and a time during which 100 mL of the air having passed through a diameter of 28.6 mm, or an area of 645 mm$^2$ was measured, and defined as an air permeability.

(4) Puncture Strength Per Film Thickness (N/μm)

A microporous film was fixed by a sample holder whose opening has a diameter of 11.3 mm by using a handy compression tester, KES-G5®, made by Kato Tech Co., Ltd. Then, a puncture test was carried out on the central portion of the fixed microporous film in an atmosphere of 25° C. at a puncture rate of 2 mm/sec using a needle whose tip has a curvature radius of 0.5 mm.

The puncture strength was calculated as a strength per 1 μm of the film thickness from the obtained value.

(5) Tensile Elastic Modulus (MPa), Tensile Strength at Break (MPa), Tensile Elongation at Break (%) and MD/TD Elastic Modulus Ratio MD and TD of a microporous film sample (shape: 10 mm wide×100 mm long) were measured for the tensile elastic modulus, the tensile strength at break, and the tensile elongation at break according to JIS K7127 by using a tensile testing machine, Autograph AG-A®, made by Shimadzu Corp. The distance between chucks was set at 50 mm; and the sample was used in which a cellophane tape (made by Nitto Denko CS System Corp., trade name: "N. 29") was pasted on one surface of both end parts (areas within 25 mm from end edges) in the longitudinal direction of the sample. Further, in order to prevent sample slippage during the test, a fluororubber of 1 mm in thickness was pasted on each of the inner sides of the chucks of the tensile testing machine.

The tensile elongation at break (%) was determined by dividing an elongated amount (mm) till the break of the sample by the distance between the chucks (50 mm) and multiplying the quotient by 100. The tensile strength at break (MPa) was determined by dividing a strength at break of the sample by a sample sectional area before the test.

The tensile elastic modulus was determined by a gradient of a stress-strain straight line between 1 to 4% of an elongation (strain) of the sample. The MD/TD elastic modulus ratio was determined by dividing an MD elastic modulus by a TD elastic modulus.

The measurement was carried out under the condition of a temperature of 23±2° C., a chuck pressure of 0.30 MPa, and a tensile speed of 200 mm/min.

(6) Limiting Viscosity (dL/g)

The limiting viscosities [η] of a polyolefin as a raw material, and a microporous film were determined under the condition of a decalin solvent and 135° C. according to ASTMD4020.

(7) Compression Elastic Modulus (kPa)

The compression elastic modulus in the film thickness direction of a microporous film was measured using a compression elastic modulus tester, TMA/SS120®, made by Seiko Instruments Inc.

The measurement was carried out under the condition of a temperature of 25° C., and a compression speed of 1 N/min, a probe area of 5.23 mm² (probe pointed end diameter: 2.58 mmφ). The compression elastic modulus was determined from a gradient of a stress-strain straight line between 0 to 10% of strains.

In the compression elastic modulus measurement, the position where a stress had emerged was defined as 0% of the strain.

(8) Friction Coefficient

A sample of a microporous film having a size of 50 mm in width×200 mm in the measurement direction was measured for the friction coefficient three times in each of MD and TD directions by using a friction tester, KES-SE, made by Kato Tech Co., Ltd., under the condition of a load of 50 g, a contactor area of 10 mm×10 mm=100 mm² (20 pieces of piano wire of 0.5 mmφ were wound), a contactor feed speed of 1 mm/sec, a tension of 6 kPa, and a temperature of 25° C.; and the average of the measurements was determined.

(9) Average Pore Diameter (μm)

It is known that a fluid inside a capillary follows Knudsen's flow when the mean free path of the fluid is larger than the pore diameter of the capillary, and follows Poiseuille's flow when the mean free path of the fluid is smaller than the pore diameter of the capillary. Then, it was assumed that the flow of the air in the air permeability measurement of a microporous film follows Knudsen's flow, and the flow of water in the water permeability measurement of the microporous film follows Poiseuille's flow.

The average pore diameter d (μm) and the tortuosity factor T (dimensionless) were determined from the permeation rate constant $R_{gas}$ (m³/(m²·sec·Pa)) of the air, the permeation rate constant $R_{liq}$ (m³/(m²·sec·Pa)) of water, the molecular velocity ν (m/sec) of the air, the viscosity η (Pa·sec) of water, a standard pressure $P_s$ (=101,325 Pa), the porosity E (%), and the film thickness L (μm) by using the following expressions:

$$d = 2\nu \times (R_{liq}/R_{gas}) \times (16\eta/3P_s) \times 10^6$$

$$T = (d \times (\varepsilon/100) \times \nu/(3L \times P_s \times R_{gas}))^{1/2}$$

Here, $R_{gas}$ was determined from the air permeability (sec) using the following expression:

$$R_{gas} = 0.0001/(\text{air permeability} \times (6.424 \times 10^{-4}) \times (0.01276 \times 101325))$$

$R_{liq}$ was determined from the water permeability (cm³/(cm²·sec·Pa)) using the following expression:

$$R_{liq} = \text{water permeability}/100$$

The water permeability was determined as follows. First a microporous film immersed in alcohol in advance was set on a stainless steel-made liquid permeation cell having a diameter of 41 mm. Then, the alcohol of the film was washed with water. Thereafter, water was made to pass through the film at a differential pressure of about 50,000 Pa, and the permeating water amount (cm³) when 120 sec had lapsed was measured. From the result, the amount of permeated water per unit time (sec) per unit pressure (Pa) per unit area (cm²) was calculated, and defined as a water permeability.

The molecular velocity ν of the air was determined from the gas constant R (=8.314), the absolute temperature T (K), the circular constant π, and the average molecular weight of the air, M (=2.896×10⁻² kg/mol), by using the following expression:

$$\nu = ((8R \times T)/(\pi \times M))^{1/2}$$

(10) Air Permeability after Pressing (sec/100 cc)

20 sheets of samples were cut out from a microporous film into a size of 50 mm×50 mm each, and laminated to obtain a laminate. Thereafter, the laminate was interposed in the laminating direction between stainless steel-made plates having a highly smooth surface, and pressed in the laminating direction under the temperature condition of 40° C. and at 5 MPa for 30 sec. The air permeabilities before and after pressing were measured by the method described in (3) described above; and the air permeability after pressing per one sheet was determined by dividing the air permeability obtained for the 20 sheets by 20.

(11) Outer Diameter Difference (mm)

The outer diameter of a roll of a microporous film was measured by a laser.

In detail, a size measuring apparatus composed of two sets of a light projecting device and a light receiving device were moved parallel to the rotation axis direction of the roll, and thereby outer diameters of the roll were measured on line across the rotation axis direction of the roll.

The detection apparatus was scanned at a speed of 30 mm/sec; and 30 points per 60 mm of a roll were measured. The measurement precision of the outer diameter was set 0.01 mm.

(12) Roll Deviation

The roll deviation after slitting was evaluated as an index of rolling stability.

A microporous film was slit into 60 mm wide under the condition of an unreel tension of 100 N/m, a taking-up tension of 100 N/m and a running speed of 100 m/min using a slitter, TH4C (trade name), made by Nishimura Mfg. Co., Ltd., and thereafter taken up on a paper core of 3 inches to obtain a roll. The degree of roll deviation of the roll at the time was evaluated. In the state of the roll after slitting, the roll having generated a deviation less than 0.3 mm was determined as the absence of roll deviation; and the roll having generated a deviation of 0.3 mm or more was determined as the presence of roll deviation.

The evaluation was carried out on 10 rolls, and the roll deviation was evaluated from the number of rolls which had been determined as the presence of roll deviation.

(13) Step Deviation

The step deviation was evaluated as follows as an index of the impact resistance stability of the microporous film roll having a rolling length of 1,000 m and taken up on the paper core of 3 inches, obtained as described in (12) described above.

The microporous film roll was set on a detection tool shown in FIG. 1, and is dropped toward an impact block from heights of 300 mm and 600 mm to impart an impact on the roll. The roll imparted with the impact was placed horizontally; a distance from the lower surface of the roll to the upper surface thereof was measured, and the step deviation was calculated by the expression shown below. A longer distance thereof means a larger step deviation.

Separately, a step deviation test was carried out in which a microporous film roll taken up on a plastic core of 8 inches under the slit condition of (12) and having a length of 2,000 m was dropped from a height of 300 mm; and the step deviation was measured likewise.

Step deviation=(a distance between the upper and lower surfaces of the roll after step deviation)−(a slit width of the roll)

(14) Wetting Index (mN/m)

The wetting index was measured according to JIS K-6768.

(15) Film Resistance ($\Omega \cdot cm^2$)

Figure 2:
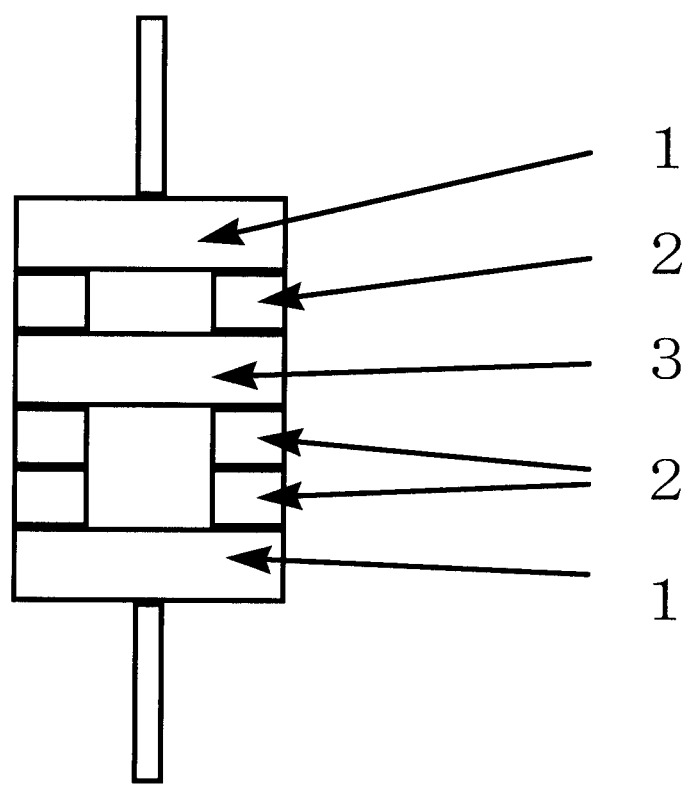
FIG. 2 is a schematic view of a cell in which the electric resistance of a microporous film is measured.

The film resistance was measured at an alternating current of 1 kHz using an LCR meter, AG-43, made by Ando Electric Co., Ltd. and a cell shown in FIG. 2, and calculated by the following expression:

Film resistance ($\Omega \cdot cm^2$)=(a resistance value when a film is present–a resistance value when a film is absent)×0.785

The measurement was carried out using an electrolyte in which 1 mol/L of lithium perchlorate was dissolved in a mixed solution of propylene carbonate and dimethoxyethane (50/50 vol %), and electrodes which were platinum black electrodes and had an electrode plate area of 0.785 $cm^2$, and a distance between the electrodes was 3 mm.

(16) Battery Taking-Up Test of a Cylindrical Battery (Short-Circuit in Taking Up a Battery and Faulty Pin Extraction)

A cylindrical battery was fabricated by a method described below to evaluate the pin extractability, and the short-circuit after battery taking-up. The evaluation was carried out using 10 cells.

<Fabrication of a Positive Electrode>

92.2% by mass of a lithium cobalt multiple oxide $LiCoO_2$ as an active substance, 2.3% by mass of scaly graphite and 2.3% by mass of acetylene black as conducting agents, and 3.2% by weight of polyvinylidene fluoride (PVDF) as a binder were dispersed in N-methyl pyrrolidone (NMP) to prepare a slurry. The slurry was applied on one surface of an aluminum foil having a thickness of 20 μm, to become a positive electrode current collector, by a die coater, dried at 130° C. for 3 minutes, and thereafter compressed and formed by a roll press machine. The formed material was cut into a strip of 56 mm in width to obtain a positive electrode.

<Fabrication of a Negative Electrode>

96.9% by mass of an artificial graphite as an active substance, and 1.4% by mass of an ammonium salt of carboxymethyl cellulose and 1.7% by mass of a styrene-butadiene copolymer latex as binders were dispersed in purified water to prepare a slurry. The slurry was applied on one surface of a copper foil having a thickness of 12 μm, to become a negative electrode current collector, by a die coater, dried at 120° C. for 3 minutes, and thereafter compressed and formed by a roll press machine. At this time, the application amount of the active material for the negative electrode was made to be 106 $g/m^2$, and the bulk density of the active material was made to be a highly filled density of 1.55 $g/cm^3$. The formed material was cut into a strip of 58 mm in width to obtain a negative electrode.

<Preparation of a Nonaqueous Electrolyte>

$LiPF_6$ as a solute was dissolved in a mixed solvent of ethylene carbonate:ethyl methyl carbonate=1:2 (volume ratio) so as to have a concentration of 1.0 mol/L. Thus, a nonaqueous electrolyte was prepared.

<Assembling of a Battery>

An electrode roll was fabricated using a separator composed of the polyolefin microporous film cut into 60 mm in width, the above-mentioned positive electrode and the negative electrode.

One end portion of two sheets overlapped separator was pinched into a slit part of a SUS-made split pin of 4.5 mm in diameter and 1 mm in slit width, and only the separator was rolled several turns; thereafter, the negative electrode, one separator, the positive electrode, and the other separator were overlapped and spirally rolled in this order to obtain an electrode roll. At this time, the load for taking up the separator was adjusted to be 200 g.

The electrode roll was accommodated in a stainless steel-made container having a lid part to become a terminal and having an outer diameter of 18 mm and a height of 65 mm; an aluminum-made tab led out from a positive electrode current collector was welded to the lid part of the container, and a nickel-made tab led out from a negative electrode current collector was welded to a wall of the container. Thereafter, the resultant was dried under vacuum at 85° C. for 12 hours. Then, the above-mentioned nonaqueous electrolyte was injected in the container in an argon box, and the container was sealed to obtain a battery.

<Faulty Pin Extraction>

When the electrode roll was fabricated, the pin extractability after rolling was judged as follows, and the faulty pin extraction was evaluated by the number of the rolls which were evaluated as failure.

After the pin was extracted, a separator which did not destroy the shape of the electrode roll was evaluated as passing, and a separator which became a bamboo shoot-like was evaluated as failure.

<Short-Circuit at Battery Taking-Up>

A short-circuit test was carried out by impressing a voltage of 100 V to an electrode roll, and the short-circuit at battery taking-up was judged as follows, and evaluated by the number of the rolls which were evaluated as failure.

An electrode roll which did not short-circuit was evaluated as passing, and an electrode roll which short-circuited was evaluated as failure.

The present embodiment will be described based on Examples.

Production Example 1

50% by mass of an ultrahigh molecular weight polyethylene homopolymer having a limiting viscosity [1] of 7.0 dL/g, 47% by mass of a high-density polyethylene homopolymer having a limiting viscosity [η] of 2.8 dL/g, and 3% by mass of a polypropylene homopolymer having a limiting viscosity [η] of 3.3 dL/g were dry blended using a tumbler blender to obtain a polymer mixture A.

Production Example 2

90% by mass of an ultrahigh molecular weight polyethylene homopolymer having a limiting viscosity $[_1]$ of 7.0 dL/g, 7% by mass of a high-density polyethylene homopolymer having a limiting viscosity [1] of 2.8 dL/g, and 3% by mass of a polypropylene homopolymer having a limiting viscosity [1] of 3.3 dL/g were dry blended using a tumbler blender to obtain a polymer mixture B.

Production Example 3

30% by mass of an ultrahigh molecular weight polyethylene homopolymer having a limiting viscosity $[_1]$ of 7.0 dL/g, 67% by mass of a high-density polyethylene homopolymer having a limiting viscosity [η] of 2.8 dL/g, and 3% by mass of a polypropylene homopolymer having a limiting viscosity [η] of 3.3 dL/g were dry blended using a tumbler blender to obtain a polymer mixture C.

Production Example 4

70% by mass of an ultrahigh molecular weight polyethylene homopolymer having a limiting viscosity [η] of 7.0 dL/g, and 30% by mass of a high-density polyethylene homopolymer having a limiting viscosity [η] of 2.8 dL/g were dry blended using a tumbler blender to obtain a polymer mixture D.

Production Example 5

50% by mass of an ultrahigh molecular weight polyethylene homopolymer having a limiting viscosity [η] of 5.5 dL/g, 47% by mass of a high-density polyethylene homopolymer having a limiting viscosity [η] of 2.8 dL/g, and 3% by mass of a polypropylene homopolymer having a limiting viscosity [η] of 3.3 dL/g were dry blended using a tumbler blender to obtain a polymer mixture E.

Example 1

While the polymer mixture A was fed to a twin-screw extruder by a feeder, a fluid paraffin was injected to the extruder cylinder by a pump. In melting and kneading in the twin-screw extruder, the operation conditions of the feeder and the pump were adjusted so that the amount of the fluid paraffin in a mixture of the polymer mixture A and the fluid paraffin extruded became 65% by mass. The kneaded material extruded from the twin-screw extruder was formed into a sheet-form, through a T-die having a lip clearance of 2,000 μm, at a cast stretch ratio of 1.05 times under cooling by a roll whose surface temperature (cast temperature) was 20° C., to obtain a gelatinous sheet of 1,200 μm in original sheet thickness.

Then, the gelatinous sheet was introduced to a simultaneous biaxial tenter stretching machine; and a simultaneous biaxial stretching was carried out at a tenter temperature (stretching temperature) of 120° C. and at a MD stretch ratio of 7.0 times and a TD stretch ratio of 6.3 times; and thereafter, the fluid paraffin was extracted and removed.

The sheet after the fluid paraffin was extracted and removed was introduced to a TD tenter heat setting machine; and a stretching was carried out at a HS stretching temperature of 125° C. and at a stretch ratio in HS (HS ratio) of 1.2 times; and finally, a heat treatment was carried out at a HS heat treatment temperature of 130° C. Physical properties of the obtained microporous film are shown in Table 1.

Examples 2 to 34, and Comparative Examples 1 to 7, 9 and 10

Microporous films were obtained as in Example 1, except for altering each condition as shown in Table 1. Physical properties of the obtained microporous films are shown in Tables 1 to 5.

Comparative Example 8

32% by mass of the polymer mixture D, 48% by mass of dioctyl phthalate (DOP), and 20% by mass of a silica micropowder were blended and granulated in a Henschel mixer, and thereafter fed to a twin-screw extruder by a feeder. The kneaded material extruded after melted and kneaded by the twin-screw extruder was formed into a sheet-form, through a T-die having a lip clearance of 500 μm, at a cast stretch ratio of 1.2 times under cooling by a roll whose surface temperature was 150° C., to obtain a gelatinous sheet of 100 μm in original sheet thickness. The DOP and the silica micropowder were extracted and removed from the sheet to obtain a microporous film. Two sheets of the obtained microporous film were overlapped, and stretched by 5.0 times in MD at 120° C. The film after stretching was further introduced to a TD tenter heat setting machine, stretched by 1.8 times in HS ratio at a HS stretching temperature of 120° C., and finally subjected to a heat treatment at a HS heat treatment temperature of 132° C. Physical properties of the obtained microporous film are shown in Table 5.

TABLE 1

|  |  |  | Example1 | Example2 | Example3 | Example4 | Example5 |
|---|---|---|---|---|---|---|---|
| Production Method | Raw Material (Polymer Mixture) |  | A | A | A | A | A |
|  | PC | % | 35 | 35 | 35 | 35 | 35 |
|  | Lip Clearance | μm | 2000 | 2000 | 2000 | 2000 | 1000 |
|  | Original Sheet Thickness | μm | 1200 | 1100 | 1000 | 900 | 800 |
|  | Cast Compression Ratio |  | 1.7 | 1.8 | 2.0 | 2.2 | 1.3 |
|  | Cast Temperature | ° C. | 20 | 20 | 20 | 20 | 20 |
|  | Cast Stretch Ratio | times | 1.05 | 1.05 | 1.05 | 1.05 | 1.05 |
|  | Stretching Temperature before Extraction | ° C. | 120 | 120 | 120 | 120 | 120 |
|  | MD Stretch Ratio before Extraction | times | 7 | 7 | 7 | 7 | 7 |
|  | TD Stretch Ratio before Extraction | times | 6.3 | 6.3 | 6.3 | 5.5 | 5 |
|  | MD Stretching Temperature after Extraction | ° C. | — | — | — | — | — |
|  | MD Stretch Ratio after Extraction | times | — | — | — | — | — |
|  | HS Stretching Temperature | ° C. | 125 | 125 | 125 | 125 | 120 |
|  | HS Heat Treatment Temperature | ° C. | 130 | 130 | 130 | 130 | 128 |
|  | HS Ratio | times | 1.2 | 1.2 | 1.2 | 1.2 | 1.2 |
| Physical Properties | Film Thickness | μm | 20 | 18 | 16 | 16 | 20 |
|  | Porosity | % | 48 | 47 | 46 | 46 | 50 |
|  | Air Permeability | sec/100 cc | 170 | 170 | 180 | 180 | 100 |
|  | Average Pore Diameter | μm | 0.06 | 0.06 | 0.05 | 0.06 | 0.06 |
|  | Puncture Strength (per film thickness) | N/μm | 0.18 | 0.18 | 0.22 | 0.23 | 0.17 |
|  | MD Elastic Modulus | Mpa | 700 | 750 | 830 | 900 | 1000 |
|  | TD Elastic Modulus | Mpa | 220 | 220 | 270 | 240 | 210 |
|  | MD/TD Elastic Modulus Ratio |  | 3.2 | 3.4 | 3.1 | 3.8 | 4.0 |
|  | MD Tensile Strength at Break | Mpa | 110 | 110 | 120 | 130 | 140 |
|  | TD Tensile Strength at Break | Mpa | 50 | 60 | 60 | 50 | 50 |
|  | MD Tensile Elongation at Break | % | 60 | 60 | 40 | 30 | 30 |
|  | TD Tensile Elongation at Break | % | 90 | 100 | 80 | 100 | 110 |
|  | Compression Elastic Modulus | Kpa | 1.5 | 2 | 3 | 3 | 1 |

TABLE 1-continued

|  |  |  |  |  |  |  |  |  |
|---|---|---|---|---|---|---|---|---|
| | | Friction Coefficient | | 0.38 | 0.35 | 0.36 | 0.35 | 0.65 |
| | | [η] | g/dL | 4 | 4 | 4 | 4 | 4 |
| | | Air Permeability after pressing | sec/100 cc | 190 | 190 | 200 | 200 | 120 |
| | | Press Air Permeability Change | % | 12 | 12 | 11 | 11 | 20 |
| Evaluations | 1000 m | Outer Diameter Difference | mm | 0.1 | 0.1 | 0.1 | 0.1 | 0.1 |
| | | Roll Deviation | rolls/10 rolls | 0 | 0 | 0 | 0 | 0 |
| | 2000 m | Outer Diameter Difference | mm | 0.1 | 0.1 | 0.1 | 0.1 | 0.1 |
| | | Roll Deviation | rolls/10 rolls | 0 | 0 | 0 | 0 | 0 |
| | 5000 m | Outer Diameter Difference | mm | 0.2 | 0.2 | 0.2 | 0.2 | 0.2 |
| | | Roll Deviation | rolls/10 rolls | 0 | 0 | 0 | 0 | 0 |
| | Deviation Width in Step Deviation Test 1,000-m Roll | 300-mm Test | mm | 0 | 0 | 0 | 0 | 0 |
| | | 600-mm Test | mm | 0 | 0 | 0 | 0 | 0 |
| | 2,000-m Roll | 300-mm Test | mm | 0 | 0 | 0 | 0 | 0 |
| | Short-Circuit in Battery Taking-Up | | cells/10 cells | 0 | 0 | 0 | 0 | 0 |
| | Faulty Pin Extraction | | cells/10 cells | 0 | 0 | 0 | 0 | 0 |

| | | | | Example 6 | Example 7 | Example 8 | Example 9 |
|---|---|---|---|---|---|---|---|
| Production Method | | Raw Material (Polymer Mixture) | | A | A | A | A |
| | | PC | % | 35 | 35 | 35 | 35 |
| | | Lip Clearance | μm | 1500 | 2000 | 2000 | 2000 |
| | | Original Sheet Thickness | μm | 800 | 700 | 1100 | 1000 |
| | | Cast Compression Ratio | | 1.9 | 2.0 | 1.8 | 2.0 |
| | | Cast Temperature | °C. | 20 | 20 | 50 | 50 |
| | | Cast Stretch Ratio | times | 1.05 | 1.05 | 1.1 | 1.1 |
| | | Stretching Temperature before Extraction | °C. | 120 | 120 | 120 | 120 |
| | | MD Stretch Ratio before Extraction | times | 7 | 7 | 7 | 7 |
| | | TD Stretch Ratio before Extraction | times | 6.3 | 6.3 | 6.3 | 6.3 |
| | | MD Stretching Temperature after Extraction | °C. | — | — | — | — |
| | | MD Stretch Ratio after Extraction | times | — | — | — | — |
| | | HS Stretching Temperature | °C. | 125 | 125 | 125 | 125 |
| | | HS Heat Treatment Temperature | °C. | 130 | 130 | 130 | 130 |
| | | HS Ratio | times | 1.2 | 1.2 | 1.2 | 1.2 |
| Physical Properties | | Film Thickness | μm | 14 | 12 | 18 | 16 |
| | | Porosity | % | 45 | 45 | 45 | 45 |
| | | Air Permeability | sec/100 cc | 150 | 140 | 150 | 140 |
| | | Average Pore Diameter | μm | 0.06 | 0.06 | 0.07 | 0.07 |
| | | Puncture Strength (per film thickness) | N/μm | 0.24 | 0.20 | 0.19 | 0.21 |
| | | MD Elastic Modulus | Mpa | 860 | 870 | 770 | 770 |
| | | TD Elastic Modulus | Mpa | 300 | 290 | 380 | 380 |
| | | MD/TD Elastic Modulus Ratio | | 2.9 | 3.0 | 2.0 | 2.0 |
| | | MD Tensile Strength at Break | Mpa | 120 | 120 | 100 | 110 |
| | | TD Tensile Strength at Break | Mpa | 60 | 60 | 70 | 70 |
| | | MD Tensile Elongation at Break | % | 40 | 30 | 60 | 50 |
| | | TD Tensile Elongation at Break | % | 80 | 80 | 110 | 100 |
| | | Compression Elastic Modulus | Kpa | 4.5 | 6 | 3 | 4 |
| | | Friction Coefficient | | 0.35 | 0.29 | 0.48 | 0.45 |
| | | [η] | g/dL | 4 | 4 | 4 | 4 |
| | | Air Permeability after pressing | sec/100 cc | 180 | 150 | 170 | 150 |
| | | Press Air Permeability Change | % | 7 | 7 | 13 | 7 |
| Evaluations | 1000 m | Outer Diameter Difference | mm | 0.1 | 0.1 | 0.1 | 0.1 |
| | | Roll Deviation | rolls/10 rolls | 0 | 0 | 0 | 0 |
| | 2000 m | Outer Diameter Difference | mm | 0.1 | 0.1 | 0.1 | 0.1 |
| | | Roll Deviation | rolls/10 rolls | 0 | 0 | 0 | 0 |
| | 5000 m | Outer Diameter Difference | mm | 0.1 | 0.1 | 0.2 | 0.2 |
| | | Roll Deviation | rolls/10 rolls | 0 | 0 | 0 | 0 |
| | Deviation Width in Step Deviation Test 1,000-m Roll | 300-mm Test | mm | 0 | 0 | 0 | 0 |
| | | 600-mm Test | mm | 0 | 0 | 0 | 0 |
| | 2,000-m Roll | 300-mm Test | mm | 0 | 0 | 0 | 0 |
| | Short-Circuit in Battery Taking-Up | | cells/10 cells | 0 | 0 | 0 | 0 |
| | Faulty Pin Extraction | | cells/10 cells | 0 | 0 | 0 | 0 |

TABLE 2

|  |  |  | Example10 | Example11 | Example12 | Example13 | Example14 |
|---|---|---|---|---|---|---|---|
| Production Method | Raw Material (Polymer Mixture) |  | A | A | A | A | A |
|  | PC | % | 35 | 35 | 35 | 35 | 35 |
|  | Lip Clearance | μm | 2000 | 2000 | 2000 | 2000 | 2000 |
|  | Original Sheet Thickness | μm | 1000 | 1000 | 900 | 900 | 1000 |
|  | Cast Compression Ratio |  | 2.0 | 2.0 | 2.2 | 2.2 | 2.0 |
|  | Cast Temperature | °C. | 80 | 80 | 50 | 50 | 20 |
|  | Cast Stretch Ratio | times | 1.2 | 1.3 | 1.1 | 1.1 | 1.3 |
|  | Stretching Temperature before Extraction | °C. | 120 | 120 | 120 | 120 | 120 |
|  | MD Stretch Ratio before Extraction | times | 7 | 7 | 7 | 7 | 7 |
|  | TD Stretch Ratio before Extraction | times | 6.3 | 6.3 | 5.3 | 6.3 | 5 |
|  | MD Stretching Temperature after Extraction | °C. | — | — | — | — | — |
|  | MD Stretch Ratio after Extraction | times | — | — | — | — | — |
|  | HS Stretching Temperature | °C. | 125 | 125 | 125 | 125 | 120 |
|  | HS Heat Treatment Temperature | °C. | 130 | 130 | 132 | 133 | 130 |
|  | HS Ratio | times | 1.2 | 1.2 | 1.2 | 1.4 | 1.2 |
| Physical Properties | Film Thickness | μm | 16 | 16 | 14 | 12 | 16 |
|  | Porosity | % | 46 | 48 | 45 | 43 | 45 |
|  | Air Permeability | sec/100 cc | 130 | 120 | 130 | 120 | 160 |
|  | Average Pore Diameter | μm | 0.05 | 0.06 | 0.07 | 0.07 | 0.06 |
|  | Puncture Strength (per film thickness) | N/μm | 0.21 | 0.2 | 0.21 | 0.24 | 0.21 |
|  | MD Elastic Modulus | Mpa | 910 | 1050 | 900 | 830 | 1280 |
|  | TD Elastic Modulus | Mpa | 250 | 220 | 280 | 450 | 220 |
|  | MD/TD Elastic Modulus Ratio |  | 3.5 | 4.8 | 3.2 | 1.8 | 5.8 |
|  | MD Tensile Strength at Break | Mpa | 140 | 160 | 120 | 130 | 160 |
|  | TD Tensile Strength at Break | Mpa | 50 | 60 |  | 70 | 60 |
|  | MD Tensile Elongation at Break | % | 30 | 20 | 40 | 40 | 20 |
|  | TD Tensile Elongation at Break | % | 100 | 100 | 90 | 60 | 100 |
|  | Compression Elastic Modulus | Kpa | 5 | 5 | 8 | 9 | 3.5 |
|  | Friction Coefficient |  | 0.45 | 0.45 | 0.38 | 0.31 | 0.25 |
|  | [η] | g/dL | 4 | 4 | 4 | 4 | 4 |
|  | Air Permeability after pressing | sec/100 cc | 140 | 130 | 135 | 125 | 170 |
|  | Press Air Permeability Change | % | 8 | 8 | 4 | 4 | 6 |
| Evaluations | 1000 m | Outer Diameter Difference | mm | 0.1 | 0.1 | 0.1 | 0.1 | 0.1 |
|  |  | Roll Deviation | rolls/10 rolls | 0 | 0 | 0 | 0 | 0 |
|  | 2000 m | Outer Diameter Difference | mm | 0.1 | 0.1 | 0.1 | 0.1 | 0.1 |
|  |  | Roll Deviation | rolls/10 rolls | 0 | 0 | 0 | 0 | 0 |
|  | 5000 m | Outer Diameter Difference | mm | 0.1 | 0.1 | 0.2 | 0.2 | 0.2 |
|  |  | Roll Deviation | rolls/10 rolls | 0 | 0 | 0 | 0 | 0 |
|  | Deviation Width in Step Deviation Test 1,000-m Roll | 300-mm Test | mm | 0 | 0 | 0 | 0 | 0 |
|  |  | 600-mm Test | mm | 0 | 0 | 0 | 0 | 0 |
|  | 2,000-m Roll | 300-mm Test | mm | 0 | 0 | 0 | 0 | 0 |
|  | Short-Circuit in Battery Taking-Up |  | cells/10 cells | 0 | 0 | 0 | 0 | 0 |
|  | Faulty Pin Extraction |  | cells/10 cells | 0 | 0 | 0 | 0 | 0 |

|  |  |  | Example15 | Example16 | Example17 | Example18 |
|---|---|---|---|---|---|---|
| Production Method | Raw Material (Polymer Mixture) |  | A | A | A | A |
|  | PC | % | 35 | 30 | 35 | 40 |
|  | Lip Clearance | μm | 2000 | 2000 | 2000 | 2000 |
|  | Original Sheet Thickness | μm | 1000 | 1200 | 1200 | 800 |
|  | Cast Compression Ratio |  | 2.0 | 1.7 | 1.7 | 2.5 |
|  | Cast Temperature | °C. | 80 | 80 | 30 | 20 |
|  | Cast Stretch Ratio | times | 1.03 | 1.05 | 1.05 | 1.05 |
|  | Stretching Temperature before Extraction | °C. | 120 | 120 | 120 | 100 |
|  | MD Stretch Ratio before Extraction | times | 7 | 7 | 7 | 7 |
|  | TD Stretch Ratio before Extraction | times | 6.3 | 6.3 | 6.3 | 6.3 |
|  | MD Stretching Temperature after Extraction | °C. | — | — | — | — |
|  | MD Stretch Ratio after Extraction | times | — | — | — | — |
|  | HS Stretching Temperature | °C. | 125 | 120 | 125 | 125 |
|  | HS Heat Treatment Temperature | °C. | 130 | 125 | 130 | 133 |
|  | HS Ratio | times | 1.2 | 1.2 | 1.2 | 1.5 |
| Physical Properties | Film Thickness | μm | 16 | 22 | 16 | 14 |
|  | Porosity | % | 45 | 55 | 42 | 38 |
|  | Air Permeability | sec/100 cc | 160 | 90 | 190 | 230 |
|  | Average Pore Diameter | μm | 0.08 | 0.09 | 0.09 | 0.05 |

TABLE 2-continued

|  |  |  | | | | | |
|---|---|---|---|---|---|---|---|
| | | Puncture Strength (per film thickness) | N/μm | 0.19 | 0.17 | 0.21 | 0.28 |
| | | MD Elastic Modulus | Mpa | 670 | 610 | 660 | 760 |
| | | TD Elastic Modulus | Mpa | 410 | 190 | 220 | 460 |
| | | MD/TD Elastic Modulus Ratio | | 1.8 | 3.2 | 3.1 | 1.8 |
| | | MD Tensile Strength at Break | Mpa | 100 | 90 | 100 | 160 |
| | | TD Tensile Strength at Break | Mpa | 70 | 60 | 70 | 110 |
| | | MD Tensile Elongation at Break | % | 60 | 60 | 50 | 50 |
| | | TD Tensile Elongation at Break | % | 110 | 110 | 100 | 60 |
| | | Compression Elastic Modulus | Kpa | 3 | 0.5 | 10 | 100 |
| | | Friction Coefficient | | 0.51 | 0.58 | 0.35 | 0.35 |
| | | [η] | g/dL | 4 | 4 | 4 | 4 |
| | | Air Permeability after pressing | sec/100 cc | 175 | 120 | 200 | 235 |
| | | Press Air Permeability Change | % | 9 | 33 | 5 | 2 |
| Evaluations | 1000 m | Outer Diameter Difference | mm | 0.1 | 0.1 | 0.1 | 0.1 |
| | | Roll Deviation | rolls/10 rolls | 0 | 0 | 0 | 0 |
| | 2000 m | Outer Diameter Difference | mm | 0.2 | 0.1 | 0.1 | 0.1 |
| | | Roll Deviation | rolls/10 rolls | 0 | 0 | 0 | 0 |
| | 5000 m | Outer Diameter Difference | mm | 0..3 | 0.1 | 0.1 | 0.2 |
| | | Roll Deviation | rolls/10 rolls | 1 | 0 | 0 | 1 |
| | Deviation Width in Step Deviation Test 1,000-m Roll | 300-mm Test | mm | 0 | 0 | 0 | 0 |
| | | 600-mm Test | mm | 0 | 1 | 0 | 0 |
| | 2,000-m Roll | 300-mm Test | mm | 0 | 0 | 0 | 0 |
| | | Short-Circuit in Battery Taking-Up | cells/10 cells | 0 | 0 | 0 | 0 |
| | | Faulty Pin Extraction | cells/10 cells | 0 | 0 | 0 | 0 |

TABLE 3

| | | | Example19 | Example20 | Example21 | Example22 |
|---|---|---|---|---|---|---|
| Production Method | Raw Material (Polymer Mixture) | | B | A | A | A |
| | PC | % | 40 | 35 | 35 | 40 |
| | Lip Clearance | μm | 2000 | 2000 | 2000 | 2000 |
| | Original Sheet Thickness | μm | 800 | 1000 | 1000 | 900 |
| | Cast Compression Ratio | | 2.5 | 2.0 | 2.0 | 2.2 |
| | Cast Temperature | ° C. | 20 | 20 | 50 | 20 |
| | Cast Stretch Ratio | times | 1.05 | 1.05 | 1.05 | 1.05 |
| | Stretching Temperature before Extraction | ° C. | 110 | 120 | 120 | 120 |
| | MD Stretch Ratio before Extraction | times | 7 | 7 | 7 | 7 |
| | TD Stretch Ratio before Extraction | times | 6.3 | 6.3 | 6.3 | 6 |
| | MD Stretching Temperature after Extraction | ° C. | — | — | — | — |
| | MD Stretch Ratio after Extraction | times | — | — | — | — |
| | HS Stretching Temperature | ° C. | 128 | 125 | 120 | 125 |
| | HS Heat Treatment Temperature | ° C. | 135 | 133 | 123 | 130 |
| | HS Ratio | times | 1.2 | 1.2 | 1.2 | 1.1 |
| Physical Properties | Film Thickness | μm | 12 | 14 | 18 | 16 |
| | Porosity | % | 35 | 42 | 48 | 45 |
| | Air Permeability | sec/100 cc | 250 | 200 | 150 | 320 |
| | Average Pore Diameter | μm | 0.06 | 0.08 | 0.05 | 0.04 |
| | Puncture Strength (per film thickness) | N/μm | 0.35 | 0.23 | 0.19 | 0.22 |
| | MD Elastic Modulus | Mpa | 780 | 720 | 670 | 960 |
| | TD Elastic Modulus | Mpa | 280 | 240 | 200 | 190 |
| | MD/TD Elastic Modulus Ratio | | 2.9 | 3.0 | 3.4 | 5.1 |
| | MD Tensile Strength at Break | Mpa | 110 | 130 | 110 | 110 |
| | TD Tensile Strength at Break | Mpa | 70 | 70 | 50 | 50 |
| | MD Tensile Elongation at Break | % | 50 | 50 | 40 | 30 |
| | TD Tensile Elongation at Break | % | 100 | 100 | 90 | 120 |
| | Compression Elastic Modulus | Kpa | 600 | 15 | 3 | 50 |
| | Friction Coefficient | | 0.85 | 0.18 | 0.71 | 0.65 |
| | [η] | g/dL | 6.5 | 4 | 4 | 4 |
| | Air Permeability after pressing | sec/100 cc | 255 | 210 | 160 | 330 |
| | Press Air Permeability Change | % | 2 | 5 | 7 | 3 |
| Evaluations | 1000 m | Outer Diameter Difference | mm | 0.1 | 0.1 | 0.1 | 0.1 |
| | | Roll Deviation | rolls/10 rolls | 0 | 0 | 0 | 0 |

TABLE 3-continued

|  |  | 2000 m | Outer Diameter Difference | mm | 0.2 | 0.1 | 0.1 | 0.1 |
|---|---|---|---|---|---|---|---|---|
|  |  |  | Roll Deviation | rolls/10 rolls | 0 | 0 | 0 | 0 |
|  |  | 5000 m | Outer Diameter Difference | mm | 0.3 | 0.2 | 0.2 | 0.2 |
|  |  |  | Roll Deviation | rolls/10 rolls | 1 | 0 | 0 | 0 |
|  | Deviation Width in | 300-mm Test | | mm | 0 | 0 | 0 | 0 |
|  | Step Deviation Test 1,000-m Roll | 600-mm Test | | mm | 0 | 1 | 0 | 0 |
|  | 2,000-m Roll | 300-mm Test | | mm | 0 | 0 | 0 | 0 |
|  | Short-Circuit in Battery Taking-Up | | | cells/10 cells | 0 | 0 | 0 | 0 |
|  | Faulty Pin Extraction | | | cells/10 cells | 0 | 0 | 1 | 0 |

|  |  |  | Example23 | Example24 | Example25 | Example26 |
|---|---|---|---|---|---|---|
| Production Method | Raw Material (Polymer Mixture) |  | A | A | A | B |
|  | PC | % | 30 | 35 | 30 | 40 |
|  | Lip Clearance | μm | 2000 | 2000 | 1500 | 2000 |
|  | Original Sheet Thickness | μm | 1200 | 1000 | 1000 | 800 |
|  | Cast Compression Ratio |  | 1.7 | 2.0 | 1.5 | 2.5 |
|  | Cast Temperature | °C. | 80 | 50 | 80 | 20 |
|  | Cast Stretch Ratio | times | 1.05 | 1.4 | 1.4 | 1.05 |
|  | Stretching Temperature before Extraction | °C. | 120 | 120 | 120 | 110 |
|  | MD Stretch Ratio before Extraction | times | 7 | 7 | 7 | 7 |
|  | TD Stretch Ratio before Extraction | times | 6.3 | 6 | 5 | 6.3 |
|  | MD Stretching Temperature after Extraction | °C. | — | — | — | — |
|  | MD Stretch Ratio after Extraction | times | — | — | — | — |
|  | HS Stretching Temperature | °C. | 125 | 125 | 120 | 130 |
|  | HS Heat Treatment Temperature | °C. | 133 | 130 | 125 | 135 |
|  | HS Ratio | times | 1.6 | 1.1 | 1.1 | 1.5 |
| Physical Properties | Film Thickness | μm | 20 | 16 | 18 | 10 |
|  | Porosity | % | 55 | 48 | 55 | 34 |
|  | Air Permeability | sec/100 cc | 80 | 200 | 90 | 300 |
|  | Average Pore Diameter | μm | 0.11 | 0.04 | 0.10 | 0.05 |
|  | Puncture Strength (per film thickness) | N/μm | 0.21 | 0.19 | 0.17 | 0.35 |
|  | MD Elastic Modulus | Mpa | 620 | 1230 | 1200 | 700 |
|  | TD Elastic Modulus | Mpa | 400 | 160 | 160 | 420 |
|  | MD/TD Elastic Modulus Ratio |  | 1.6 | 7.7 | 7.5 | 1.7 |
|  | MD Tensile Strength at Break | Mpa | 110 | 200 | 180 | 110 |
|  | TD Tensile Strength at Break | Mpa | 90 | 30 | 30 | 90 |
|  | MD Tensile Elongation at Break | % | 70 | 20 | 20 | 50 |
|  | TD Tensile Elongation at Break | % | 40 | 110 | 100 | 50 |
|  | Compression Elastic Modulus | Kpa | 0.5 | 3 | 0.5 | 700 |
|  | Friction Coefficient |  | 0.45 | 0.54 | 0.62 | 0.11 |
|  | [η] | g/dL | 4 | 4 | 4 | 8.5 |
|  | Air Permeability after pressing | sec/100 cc | 130 | 240 | 120 | 310 |
|  | Press Air Permeability Change | % | 63 | 20 | 44 | 3 |
| Evaluations | 1000 m | Outer Diameter Difference | mm | 0.1 | 0.1 | 0.1 | 0.1 |
|  |  | Roll Deviation | rolls/10 rolls | 0 | 0 | 0 | 0 |
|  | 2000 m | Outer Diameter Difference | mm | 0.1 | 0.1 | 0.1 | 0.2 |
|  |  | Roll Deviation | rolls/10 rolls | 0 | 0 | 0 | 0 |
|  | 5000 m | Outer Diameter Difference | mm | 0.2 | 0.2 | 0.1 | 0.3 |
|  |  | Roll Deviation | rolls/10 rolls | 0 | 2 | 0 | 1 |
|  | Deviation Width in | 300-mm Test | mm | 0 | 1 | 0 | 0 |
|  | Step Deviation Test 1,000-m Roll | 600-mm Test | mm | 0 | 2 | 1 | 0 |
|  | 2,000-m Roll | 300-mm Test | mm | 0 | 1 | 0 | 0 |
|  | Short-Circuit in Battery Taking-Up |  | cells/10 cells | 0 | 1 | 0 | 0 |
|  | Faulty Pin Extraction |  | cells/10 cells | 0 | 0 | 0 | 0 |

TABLE 4

|  |  |  | Example27 | Example28 | Example29 | Example30 |
|---|---|---|---|---|---|---|
| Production Method | Raw Material (Polymer Mixture) |  | E | E | E | E |
|  | PC | % | 35 | 35 | 35 | 35 |
|  | Lip Clearance | μm | 2000 | 2000 | 2000 | 1500 |
|  | Original Sheet Thickness | μm | 1200 | 1100 | 1000 | 800 |
|  | Cast Compression Ratio |  | 1.7 | 1.8 | 2.0 | 1.9 |
|  | Cast Temperature | °C. | 20 | 20 | 20 | 20 |
|  | Cast Stretch Ratio | times | 1.05 | 1.05 | 1.05 | 1.05 |
|  | Stretching Temperature before Extraction | °C. | 120 | 120 | 120 | 120 |
|  | MD Stretch Ratio before Extraction | times | 7 | 7 | 7 | 7 |
|  | TD Stretch Ratio before Extraction | times | 5.3 | 5.3 | 6.3 | 6.3 |
|  | MD Stretching Temperature after Extraction | °C. | — | — | — | — |
|  | MD Stretch Ratio after Extraction | times | — | — | — | — |
|  | HS Stretching Temperature | °C. | 125 | 125 | 125 | 125 |
|  | HS Heat Treatment Temperature | °C. | 130 | 130 | 130 | 130 |
|  | HS Ratio | times | 1.2 | 1.2 | 1.2 | 1.2 |
| Physical Properties | Film Thickness | μm | 20 | 18 | 16 | 14 |
|  | Porosity | % | 47 | 46 | 45 | 45 |
|  | Air Permeability | sec/100 cc | 170 | 150 | 160 | 140 |
|  | Average Pore Diameter | μm | 0.05 | 0.05 | 0.05 | 0.06 |
|  | Puncture Strength (per film thickness) | N/μm | 0.17 | 0.16 | 0.21 | 0.23 |
|  | MD Elastic Modulus | Mpa | 680 | 740 | 810 | 850 |
|  | TD Elastic Modulus | Mpa | 210 | 210 | 270 | 300 |
|  | MD/TD Elastic Modulus Ratio |  | 3.2 | 3.5 | 3.0 | 2.8 |
|  | MD Tensile Strength at Break | Mpa | 110 | 110 | 120 | 120 |
|  | TD Tensile Strength at Break | Mpa | 50 | 60 | 60 | 60 |
|  | MD Tensile Elongation at Break | % | 50 | 50 | 40 | 40 |
|  | TD Tensile Elongation at Break | % | 90 | 100 | 80 | 80 |
|  | Compression Elastic Modulus | Kpa | 1.5 | 2 | 2 | 3 |
|  | Friction Coefficient |  | 0.38 | 0.35 | 0.35 | 0.35 |
|  | [η] | g/dL | 3.5 | 3.5 | 3.5 | 3.5 |
|  | Air Permeability after pressing | sec/100 cc | 190 | 190 | 200 | 150 |
|  | Press Air Permeability Change | % | 12 | 19 | 25 | 14 |
| Evaluations | 1000 m | Outer Diameter Difference | mm | 0.1 | 0.1 | 0.1 | 0.1 |
|  |  | Roll Deviation | rolls/10 rolls | 0 | 0 | 0 | 0 |
|  | 2000 m | Outer Diameter Difference | mm | 0.1 | 0.1 | 0.1 | 0.1 |
|  |  | Roll Deviation | rolls/10 rolls | 0 | 0 | 0 | 0 |
|  | 5000 m | Outer Diameter Difference | mm | 0.2 | 0.2 | 0.2 | 0.1 |
|  |  | Roll Deviation | rolls/10 rolls | 0 | 0 | 0 | 0 |
|  | Deviation Width in Step Deviation Test 1,000-m Roll | 300-mm Test | mm | 0 | 0 | 0 | 0 |
|  |  | 600-mm Test | mm | 0 | 0 | 0 | 0 |
|  | 2,000-m Roll | 300-mm Test | mm | 0 | 0 | 0 | 0 |
|  | Short-Circuit in Battery Taking-Up |  | cells/10 cells | 0 | 0 | 0 | 0 |
|  | Faulty Pin Extraction |  | cells/10 cells | 0 | 0 | 0 | 0 |

|  |  |  | Example31 | Example32 | Example33 | Example34 |
|---|---|---|---|---|---|---|
| Production Method | Raw Material (Polymer Mixture) |  | E | E | E | E |
|  | PC | % | 35 | 35 | 35 | 35 |
|  | Lip Clearance | μm | 1500 | 2000 | 2000 | 2000 |
|  | Original Sheet Thickness | μm | 1100 | 1000 | 900 | 1200 |
|  | Cast Compression Ratio |  | 1.8 | 2.0 | 2.2 | 1.7 |
|  | Cast Temperature | °C. | 50 | 50 | 50 | 50 |
|  | Cast Stretch Ratio | times | 1.1 | 1.1 | 1.1 | 1.1 |
|  | Stretching Temperature before Extraction | °C. | 120 | 120 | 120 | 120 |
|  | MD Stretch Ratio before Extraction | times | 7 | 7 | 7 | 7 |
|  | TD Stretch Ratio before Extraction | times | 6.3 | 6.3 | 6.3 | 5 |
|  | MD Stretching Temperature after Extraction | °C. | — | — | — | — |
|  | MD Stretch Ratio after Extraction | times | — | — | — | — |
|  | HS Stretching Temperature | °C. | 125 | 125 | 125 | 128 |
|  | HS Heat Treatment Temperature | °C. | 130 | 130 | 132 | 133 |
|  | HS Ratio | times | 1.2 | 1.2 | 1.2 | 1.1 |
| Physical Properties | Film Thickness | μm | 18 | 18 | 14 | 16 |
|  | Porosity | % | 44 | 44 | 44 | 44 |
|  | Air Permeability | sec/100 cc | 160 | 150 | 140 | 120 |
|  | Average Pore Diameter | μm | 0.07 | 0.07 | 0.07 | 0.05 |

TABLE 4-continued

|  |  |  |  |  |  |  |
|---|---|---|---|---|---|---|
|  | Puncture Strength (per film thickness) | N/μm | 0.18 | 0.20 | 0.20 | 0.23 |
|  | MD Elastic Modulus | Mpa | 760 | 750 | 880 | 1200 |
|  | TD Elastic Modulus | Mpa | 360 | 370 | 270 | 160 |
|  | MD/TD Elastic Modulus Ratio |  | 2.1 | 2.0 | 3.3 | 6.7 |
|  | MD Tensile Strength at Break | Mpa | 100 | 110 | 120 | 170 |
|  | TD Tensile Strength at Break | Mpa | 70 | 70 | 70 | 30 |
|  | MD Tensile Elongation at Break | % | 60 | 50 | 40 | 20 |
|  | TD Tensile Elongation at Break | % | 110 | 100 | 90 | 100 |
|  | Compression Elastic Modulus | Kpa | 3 | 4 | 5 | 5 |
|  | Friction Coefficient |  | 0.48 | 0.45 | 0.38 | 0.35 |
|  | [η] | g/dL | 3.5 | 3.5 | 3.5 | 3.5 |
|  | Air Permeability after pressing | sec/100 cc | 170 | 160 | 150 | 125 |
|  | Press Air Permeability Change | % | 6 | 7 | 7 | 4 |
| Evaluations | 1000 m Outer Diameter Difference | mm | 0.1 | 0.1 | 0.1 | 0.1 |
|  | Roll Deviation | rolls/10 rolls | 0 | 0 | 0 | 0 |
|  | 2000 m Outer Diameter Difference | mm | 0.1 | 0.1 | 0.1 | 0.1 |
|  | Roll Deviation | rolls/10 rolls | 0 | 0 | 0 | 0 |
|  | 5000 m Outer Diameter Difference | mm | 0.2 | 0.2 | 0.2 | 0.2 |
|  | Roll Deviation | rolls/10 rolls | 0 | 0 | 0 | 0 |
|  | Deviation Width in 300-mm Test | mm | 0 | 0 | 0 | 0 |
|  | Step Deviation Test 600-mm Test 1,000-m Roll | mm | 0 | 0 | 0 | 0 |
|  | 2,000-m Roll 300-mm Test | mm | 0 | 0 | 0 | 0 |
|  | Short-Circuit in Battery Taking-Up | cells/10 cells | 0 | 0 | 0 | 0 |
|  | Faulty Pin Extraction | cells/10 cells | 0 | 0 | 0 | 0 |

TABLE 5

|  |  |  | Comparative Example1 | Comparative Example2 | Comparative Example3 | Comparative Example4 | Comparative Example5 | Comparative Example6 |
|---|---|---|---|---|---|---|---|---|
| Production Method | Raw Material (Polymer Mixture) |  | A | A | A | A | C | C |
|  | PC | % | 35 | 25 | 25 | 25 | 45 | 45 |
|  | Lip Clearance | μm | 2000 | 1500 | 1500 | 1700 | 2500 | 2500 |
|  | Original Sheet Thickness | μm | 1200 | 1500 | 1500 | 1500 | 800 | 800 |
|  | Cast Compression Ratio |  | 1.7 | 1.0 | 1.0 | 1.1 | 3.1 | 3.1 |
|  | Cast Temperature | ° C. | 50 | 110 | 110 | 110 | 10 | 10 |
|  | Cast Stretch Ratio | times | 1 | 1 | 1.05 | 1.4 | 1 | 1.1 |
|  | Stretching Temperature before Extraction | ° C. | 120 | 125 | 125 | 125 | 100 | 100 |
|  | MD Stretch Ratio before Extraction | times | 7 | 5 | 5 | 7 | 7 | 7 |
|  | TD Stretch Ratio before Extraction | times | 6.3 | 5 | 5 | 5 | 6.3 | 6.3 |
|  | MD Stretching Temperature after Extraction | ° C. | — | — | — | — | — | — |
|  | MD Stretch Ratio after Extraction | times | — | — | — | — | — | — |
|  | HS Stretching Temperature | ° C. | 125 | 110 | 110 | 110 | 130 | 130 |
|  | HS Heat Treatment Temperature | ° C. | 130 | 120 | 120 | 120 | 135 | 135 |
|  | HS Ratio | times | 1.5 | 2 | 1.1 | 1.1 | 1.6 | 1.2 |
| Physical Properties | Film Thickness | μm | 15 | 30 | 30 | 25 | 16 | 16 |
|  | Porosity | % | 45 | 70 | 65 | 65 | 32 | 30 |
|  | Air Permeability | sec/100 cc | 180 | 30 | 40 | 30 | 400 | 100 |
|  | Average Pore Diameter | μm | 0.05 | 0.12 | 0.11 | 0.11 | 0.05 | 0.05 |
|  | Puncture Strength (per film thickness) | N/μm | 0.21 | 0.07 | 0.08 | 0.08 | 0.32 | 0.32 |
|  | MD Elastic Modulus | Mpa | 800 | 330 | 450 | 550 | 810 | 1030 |
|  | TD Elastic Modulus | Mpa | 540 | 400 | 90 | 70 | 450 | 330 |
|  | MD/TD Elastic Modulus Ratio |  | 1.0 | 0.8 | 5.0 | 7.0 | 1.2 | 3.1 |
|  | MD Tensile Strength at Break | Mpa | 100 | 60 | 70 | 110 | 120 | 170 |
|  | TD Tensile Strength at Break | Mpa | 70 | 70 | 30 | 30 | 100 | 50 |
|  | MD Tensile Elongation at Break | % | 90 | 170 | 40 | 20 | 120 | 30 |
|  | TD Tensile Elongation at Break | % | 100 | 160 | 80 | 90 | 150 | 110 |
|  | Compression Elastic Modulus | Kpa | 1 | 0.05 | 0.05 | 0.05 | 1500 | 1500 |
|  | Friction Coefficient |  | 0.42 | 0.78 | 0.75 | 0.73 | 0.31 | 0.26 |
|  | [η] | g/dL | 4 | 3 | 3 | 3 | 6.5 | 6.5 |
|  | Air Permeability after pressing | sec/100 cc | 200 | 50 | 80 | 75 | 820 | 720 |
|  | Press Air Permeability Change | % | 11 | 200 | 100 | 150 | 3 | 3 |

TABLE 5-continued

| Evaluations | 1000 m | Outer Diameter Difference | mm | 0.2 | 0.1 | 0.1 | 0.1 | 0.4 | 0.4 |
|---|---|---|---|---|---|---|---|---|---|
| | | Roll Deviation | rolls/10 rolls | 1 | 1 | 0 | 0 | 2 | 0 |
| | 2000 m | Outer Diameter Difference | mm | 0.3 | 0.1 | 0.1 | 0.1 | 0.8 | 0.7 |
| | | Roll Deviation | rolls/10 rolls | 2 | 2 | 0 | 0 | 4 | 0 |
| | 5000 m | Outer Diameter Difference | mm | 0.6 | 0.2 | 0.2 | 0.2 | 1.4 | 1.2 |
| | | Roll Deviation | rolls/10 rolls | 4 | 5 | 0 | 0 | 6 | 0 |
| | Deviation Width in Step Deviation Test 1,000-m Roll | 300-mm Test | mm | 0 | 3 | 5 | 10 | 0 | 0 |
| | | 600-mm Test | mm | 0 | 15 | 20 | 50 | 0 | 0 |
| | 2,000-m Roll | 300-mm Test | mm | 0 | 8 | 10 | 20 | 0 | 0 |
| | Short-Circuit in Battery Taking-Up | | cells/10 cells | 0 | 0 | 0 | 3 | 0 | 0 |
| | Faulty Pin Extraction | | cells/10 cells | 0 | 2 | 2 | 2 | 0 | 0 |

| | | | | Comparative Example7 | Comparative Example8 | Comparative Example9 | Comparative Example10 |
|---|---|---|---|---|---|---|---|
| Production Method | Raw Material (Polymer Mixture) | | | C | D | A | A |
| | PC | | % | 45 | 32 | 25 | 25 |
| | Lip Clearance | | μm | 2500 | 500 | 1700 | 1500 |
| | Original Sheet Thickness | | μm | 700 | 100 | 1500 | 1500 |
| | Cast Compression Ratio | | | 3.6 | 5.0 | 1.1 | 1.0 |
| | Cast Temperature | | ° C. | 10 | 150 | 110 | 110 |
| | Cast Stretch Ratio | | times | 1.6 | 1.2 | 1.4 | 1 |
| | Stretching Temperature before Extraction | | ° C. | 100 | 120 | 125 | 125 |
| | MD Stretch Ratio before Extraction | | times | 7 | — | 7 | 5 |
| | TD Stretch Ratio before Extraction | | times | 5 | — | 5 | 5 |
| | MD Stretching Temperature after Extraction | | ° C. | — | 120 | — | — |
| | MD Stretch Ratio after Extraction | | times | — | 5 | — | — |
| | HS Stretching Temperature | | ° C. | 130 | 120 | 110 | 110 |
| | HS Heat Treatment Temperature | | ° C. | 138 | 132 | 120 | 120 |
| | HS Ratio | | times | 1.1 | 1.6 | 1.1 | 1.4 |
| Physical Properties | Film Thickness | | μm | 12 | 30 | 20 | 25 |
| | Porosity | | % | 28 | 70 | 47 | 65 |
| | Air Permeability | | sec/100 cc | 800 | 20 | 160 | 40 |
| | Average Pore Diameter | | μm | 0.03 | 0.15 | 0.09 | 0.09 |
| | Puncture Strength (per film thickness) | | N/μm | 0.56 | 0.09 | 0.17 | 0.07 |
| | MD Elastic Modulus | | Mpa | 1450 | 470 | 600 | 550 |
| | TD Elastic Modulus | | Mpa | 180 | 90 | 75 | 480 |
| | MD/TD Elastic Modulus Ratio | | | 8.1 | 5.2 | 8.0 | 1.0 |
| | MD Tensile Strength at Break | | Mpa | 230 | 110 | 120 | 60 |
| | TD Tensile Strength at Break | | Mpa | 30 | 20 | 30 | 60 |
| | MD Tensile Elongation at Break | | % | 10 | 40 | 20 | 180 |
| | TD Tensile Elongation at Break | | % | 90 | 200 | 90 | 160 |
| | Compression Elastic Modulus | | Kpa | 2000 | 0.05 | 14 | 0.3 |
| | Friction Coefficient | | | 0.15 | 0.45 | 0.36 | 0.55 |
| | [η] | | g/dL | 6.5 | 5.5 | 3 | 3 |
| | Air Permeability after pressing | | sec/100 cc | 810 | 80 | 200 | 50 |
| | Press Air Permeability Change | | % | 1 | 167 | 25 | 125 |
| Evaluations | 1000 m | Outer Diameter Difference | mm | 0.4 | 0.1 | 0.1 | 0.2 |
| | | Roll Deviation | rolls/10 rolls | 0 | 0 | 0 | 1 |
| | 2000 m | Outer Diameter Difference | mm | 0.7 | 0.2 | 0.2 | 0.2 |
| | | Roll Deviation | rolls/10 rolls | 0 | 0 | 1 | 2 |
| | 5000 m | Outer Diameter Difference | mm | 1.2 | 0.3 | 0.3 | 0.7 |
| | | Roll Deviation | rolls/10 rolls | 0 | 0 | 2 | 5 |
| | Deviation Width in Step Deviation Test 1,000-m Roll | 300-mm Test | mm | 2 | 20 | 2 | 3 |
| | | 600-mm Test | mm | 5 | 40 | 3 | 12 |
| | 2,000-m Roll | 300-mm Test | mm | 3 | 25 | 0 | 7 |
| | Short-Circuit in Battery Taking-Up | | cells/10 cells | 3 | 0 | 5 | 0 |
| | Faulty Pin Extraction | | cells/10 cells | 1 | 0 | 0 | 0 |

Example 35

The surface of the microporous film obtained in Example 1 was subjected to a corona discharge treatment with a discharge amount of 40 W/min/m² to carry out a hydrophilicizing treatment, and the wetting index acquired of the microporous film surface was 60 mN/m. The film resistance of the microporous film was measured and was 0.31 Ω·cm².

Examples 36 to 38

The hydrophilicizing treatment was carried out as in Example 35, except for altering the kind of the microporous film subjected to the hydrophilicizing treatment as shown in Table 6. Respective wetting indices and film resistances of the microporous films after the hydrophilicizing treatment are shown in Table 6.

Example 39

The film resistance of the microporous film obtained in Example 1, which had been subjected to no hydrophilicizing treatment, was measured and was 0.72 Ω·cm². The wetting index of the microporous film surface was 38 mN/m.

Examples 40 to 42

The film resistances of the microporous films with no hydrophilicizing treatment shown in Table 6 were measured. The wetting indices of the surfaces and the film resistances are shown in Table 6.

TABLE 6

|  | Microporous Film | Discharge Amount (W/min/m²) | Wetting Index (mN/m) | Film Resistance (Ω·cm²) |
|---|---|---|---|---|
| Example 35 | Example 1 | 40 | 60 | 0.31 |
| Example 36 | Example 7 | 40 | 60 | 0.24 |
| Example 37 | Example 12 | 40 | 60 | 0.28 |
| Example 38 | Example 16 | 40 | 60 | 0.30 |
| Example 39 | Example 1 | — | 38 | 0.72 |
| Example 40 | Example 7 | — | 38 | 0.34 |
| Example 41 | Example 12 | — | 38 | 0.45 |
| Example 42 | Example 16 | — | 38 | 0.61 |

As is clear from the results shown in Tables 1 to 5, by setting the compression elastic modulus and the MD/TD elastic modulus ratio in specific ranges, the both acts synergistically and microporous films can be obtained which hardly generates roll deviation and hardly generates step deviation. Thereby, microporous film rolls can be obtained which are suitable for long-sizing and excellent in the rolling stability.

In addition to the above-mentioned properties, by setting the friction coefficient of a microporous film in a specific range, the generation of a short-circuit and faulty pin extraction can be suppressed even in the battery taking-up step, allowing to improve the stability in battery taking-up without damaging the productivity of the battery.

Further by setting the average pore diameter in a specific range, microporous films can be obtained which prevent the permeability from being damaged even when the microporous films receive compression in the film thickness direction.

Further by setting the compression elastic modulus, the ratio of the tensile elastic modulus in the longitudinal direction to the tensile elastic modulus in the transverse direction, and the average pore diameter of microporous films in respective specific ranges, the tripartite acts synergistically and microporous films can be obtained which hardly generate roll deviation, hardly generate step deviation, and additionally, hardly cause a short-circuit in taking up a battery, are good in pin extractability, are low in air permeability after pressing, and are low in air permeability change ratio before and after pressing.

Additionally, as shown in Table 6, the microporous films can decrease, by being subjected to the hydrophilicizing treatment, the film resistance to nearly half.

The present application is based on a Japan Patent Application (Japanese Patent Laid-Open No. 2008-334528), filed on Dec. 26, 2008 to Japan Patent Office, and a Japan Patent Application (Japanese Patent Laid-Open No. 2009-212512), filed on Sep. 14, 2009 to Japan Patent Office, the subjects of which are incorporated herein by reference.

INDUSTRIAL APPLICABILITY

The polyolefin microporous film according to the present invention has an industrial applicability especially as a separator for a nonaqueous electrolyte secondary battery.

REFERENCE SIGNS LIST

1: ELECTRODE
2: TEFLON®-MADE PACKING (outer diameter: 2 cm, inner diameter: 1 cm, thickness: 1 mm)
3: MICROPOROUS FILM

The invention claimed is:

1. A biaxially stretched polyolefin microporous film, having a compression elastic modulus of 0.1 to 50 kPa, and a ratio of a tensile elastic modulus in a longitudinal direction to a tensile elastic modulus in a transverse direction of 1.5 to 7.8, wherein
   a tensile strength at break in the transverse direction of the biaxially stretched polyolefin microporous film is 50 MPa or more and 500 MPa or less,
   an average pore diameter of the polyolefin microporous film is 0.06 to 0.09 μm, and wherein an air permeability of the biaxially stretched polyolefin microporous film is in the range of 10 sec/100 cc to 500 sec/100 cc.

2. The biaxially stretched polyolefin microporous film according to claim 1, wherein the polyolefin microporous film has a friction coefficient in the transverse direction of 0.2 to 0.7.

3. The biaxially stretched polyolefin microporous film according to claim 1 or 2, wherein the polyolefin microporous film has a compression elastic modulus of 0.1 to 15 kPa.

4. The biaxially stretched polyolefin microporous film according to claim 1 or 2, wherein the polyolefin microporous film has been subjected to a hydrophilicizing treatment.

5. The biaxially stretched polyolefin microporous film roll, obtained by rolling the biaxially stretched polyolefin microporous film according to claim 1 or 2.

6. A separator for a nonaqueous electrolyte secondary battery, comprising the biaxially stretched polyolefin microporous film according to claim 1 or 2.

7. A nonaqueous electrolyte secondary battery, comprising the separator for the nonaqueous electrolyte secondary battery according to claim 6, a positive electrode, a negative electrode, and the electrolyte.

8. The biaxially stretched polyolefin microporous film according to claim 1, wherein an air permeability of the polyolefin microporous film is 80 sec/100 cc or more and 300 sec/100 cc or less.

9. A separator for a nonaqueous electrolyte secondary battery, comprising the biaxially stretched polyolefin microporous film according to claim 8.

10. A nonaqueous electrolyte secondary battery, comprising the separator for the nonaqueous electrolyte secondary battery according to claim 9, a positive electrode, a negative electrode, and the electrolyte.

11. The biaxially stretched polyolefin microporous film according to claim 1 further having the compression elastic modulus of 1 to 15 kPa.

* * * * *